(12) United States Patent
Inamdar et al.

(10) Patent No.: US 10,785,122 B2
(45) Date of Patent: Sep. 22, 2020

(54) CANARY RELEASE VALIDATION MECHANISMS FOR A CONTAINERIZED APPLICATION OR SERVICE MESH

(71) Applicant: Cisco Technology, Inc., San Jose, CA (US)

(72) Inventors: Kaustubh Inamdar, Bangalore (IN); Ram Mohan Ravindranath, Bangalore (IN); Gonzalo Salgueiro, Raleigh, NC (US); Sebastian Jeuk, Munich (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 76 days.

(21) Appl. No.: 16/153,417

(22) Filed: Oct. 5, 2018

(65) Prior Publication Data
US 2020/0112487 A1    Apr. 9, 2020

(51) Int. Cl.
| G06F 15/173 | (2006.01) |
| H04L 12/24 | (2006.01) |
| H04L 29/08 | (2006.01) |
| H04L 12/26 | (2006.01) |

(52) U.S. Cl.
CPC .............. *H04L 41/14* (2013.01); *H04L 43/08* (2013.01); *H04L 67/10* (2013.01)

(58) Field of Classification Search
CPC ................................. H04L 41/14; H04L 43/08
USPC ........................................................ 709/224
See application file for complete search history.

(56) References Cited

U.S. PATENT DOCUMENTS

| 8,990,778 B1* | 3/2015 | Allocca ............... G06F 11/3692 717/126 |
| 2014/0379901 A1* | 12/2014 | Tseitlin ................... H04L 43/08 709/224 |
| 2017/0126506 A1* | 5/2017 | Padala .................... H04L 43/08 |
| 2018/0137032 A1* | 5/2018 | Tannous .............. G06F 11/3664 |
| 2018/0270122 A1* | 9/2018 | Brown ............... H04L 41/5032 |
| 2018/0270125 A1* | 9/2018 | Jain ......................... G06F 11/30 |
| 2018/0288129 A1* | 10/2018 | Joshi ....................... H04L 43/08 |

FOREIGN PATENT DOCUMENTS

KR           101073402 B1 * 10/2011

\* cited by examiner

*Primary Examiner* — Hee Soo Kim
(74) *Attorney, Agent, or Firm* — Polsinelli PC

(57) ABSTRACT

Systems and methods provide for validating a canary release of containers in a containerized production environment. A first container of the containerized production environment can receive network traffic. The first container can transmit the network traffic to a first version of a second container of the containerized production environment and to a traffic analysis engine. First metrics relating to processing by the first version of the second container can be captured. The traffic analysis engine can determine one or more traffic patterns included in the network traffic. The traffic analysis engine can cause simulated network traffic corresponding to the one or more traffic patterns to be transmitted to a second version (e.g., a canary release) of the containerized production environment. Second metrics relating to processing by the second version of the second container can be captured. A comparison between the first metrics and the second metrics can be presented.

20 Claims, 9 Drawing Sheets

CANARY RELEASE VALIDATION MECHANISMS FOR A CONTAINERIZED APPLICATION OR SERVICE MESH

TECHNICAL FIELD

The subject matter of this disclosure relates in general to the field of telecommunications networks, and more particularly, to systems and methods for validating canary releases for containerized environments.

BACKGROUND

Containers are an example of an approach for implementing operating-system-level virtualization. They are self-contained execution environments that can have their own isolated CPU, memory, input/output (I/O), and network resources, and may share a kernel of a host operating system. Containers can be isolated from one other and from their hosts (physical and/or virtual servers). For example, they can have their own file systems. They may have no visibility into each other's processes. Their computing resources (e.g., processing, storage, networking, etc.) can be bounded. Containers can be easier to build and configure than virtual machines, and because containers can be decoupled from their underlying infrastructure and from host file systems, they can be highly portable across various clouds and operating system distributions. Enterprises can rapidly develop software for distributed applications, services, and microservices in private networks, public clouds, or both (e.g., hybrid clouds or multi-clouds) by running them in containers in development and test environments. However, limitations of current approaches for deploying containers in a production environment can be a bottleneck for delivering new and updated containerized environments to market as quickly as possible.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
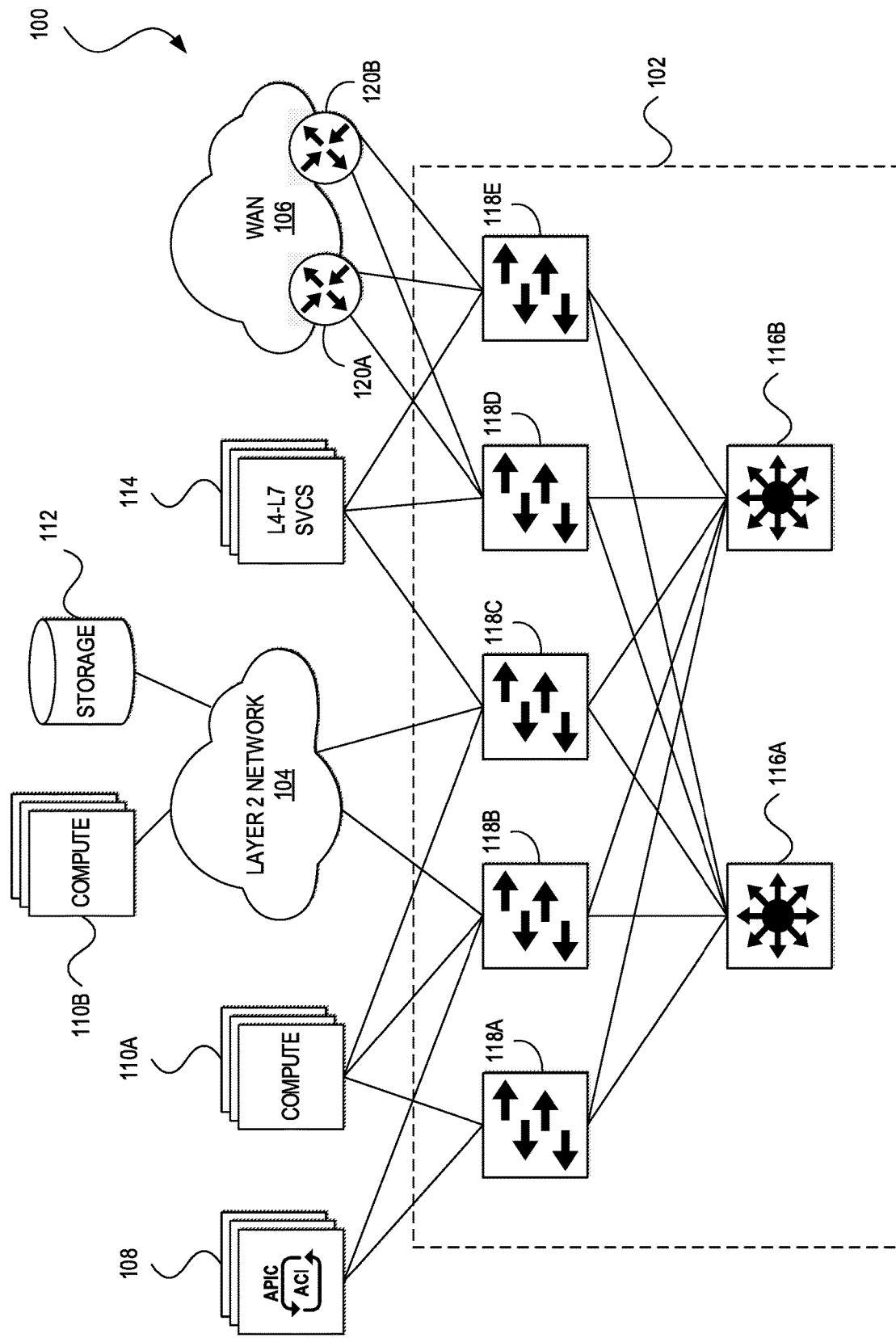
FIG. 1 illustrates an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for validating a canary release of one or more containers of a containerized environment. A first container of the containerized environment can receive network traffic. The first container can transmit the network traffic to a first version of a second container of the containerized environment and to a traffic analysis engine. First metrics relating to processing by the first version of the second container can be captured. The traffic analysis engine can determine one or more traffic patterns included in the network traffic. The traffic analysis engine can cause simulated network traffic corresponding to the one or more traffic patterns to be transmitted to a second version (e.g., a canary release) of the containerized environment. Second metrics relating to processing by the second version of the second container can be captured. A comparison between the first metrics and the second metrics can be presented.

Example Embodiments

Canary testing is a technique that may be used to softly deploy a new version or release of an application in a production environment. In current implementations, a canary release of the application may initially handle a small percentage of live network traffic (e.g., 5%) and/or serve a small portion of users (e.g., beta users) to understand how the updated application performs in the production environment. By deploying the updated application to a small subset of the user base and/or for a small subset of traffic, administrators can quickly roll back changes in the event major issues are discovered during trial runs of the canary version. However, this approach for incrementally releasing an updated application can suffer from various drawbacks. For example, there may never be a way to truly gauge the stability of the updated application until it is deployed to the entire user base for all network traffic. As another example, infrequently occurring application interactions may not be revealed via incremental canary testing. As yet another example, the subset of users and/or the subset of traffic handled by the canary release may be insufficiently diverse relative to the actual user base and actual traffic patterns in order to evaluate how the canary release processes heterogeneous traffic.

Various embodiments of the present disclosure may overcome these and other deficiencies of the prior art by enabling canary testing of one or more containers using simulated network traffic representing actual traffic flowing through a containerized production environment. In some embodiments, a controller for a containerized environment can enable canary testing for the entire environment, which may be suitable for major updates (e.g., a canary version or release of a containerized application, container mesh, or other container deployment that spans several services and their corresponding microservices or updates a substantial number of the microservices of the containerized environment). The controller can specify how to deploy the canary version of the containerized environment, such as by configuring canary versions to execute in co-location with non-canary versions, non-overlapping hosts, partially overlapping hosts, hosts for optimizing performance of the canary versions, hosts for optimizing performance of the non-canary versions, or hosts for minimal performance of the canary versions (e.g., for simple functionality verification).

In some embodiments, a controller for a containerized environment can alternatively or additionally enable canary testing of a specific container/pod (sometimes also referred to herein as a service, micro service, or node) or set of containers/pods of the containerized environment. In addition, the controller can deploy different combinations of versions of services or microservices for canary testing. For example, if an administrator selects canary version X for microservice A and canary version Y for microservice B within the same containerized production environment, the controller can detect if the selected canary versions are compatible with one another before deploying them in combination. This can be critical for large environments having many different canary versions to select from but in which not all permutations are complementary with one another. In some embodiments, white-listing and/or black-listing may be used for checking interdependencies among different versions of the services and microservices.

In addition to selecting the type of canary deployment (e.g., all of the elements of a containerized environment, a subset of the services or microservices of the containerized environment, or a specific service or microservice of the containerized environment), the controller can also specify the type of traffic that is forwarded to the canary versions. In some embodiments, the different traffic classes can be binary and include broad spectrum traffic and real time traffic. For broad spectrum traffic, network traffic can be recorded to identify traffic patterns or to build traffic models. The containerized environment can generate traffic corresponding to the patterns or models for canary testing to verify certain events or to evaluate different types of traffic. Some examples of events include initial sign-up for an application, network interruptions, or peak-time versus off-peak time. Some examples of different classes of traffic include web traffic (e.g., Hypertext Transfer Protocol (HTTP) or Quick User Datagram Protocol (QUIC)), Voice over Internet Protocol (VoIP) traffic, streaming traffic (e.g., Real-time Transport Protocol (RTP) or Real Time Streaming Protocol (RTSP)), or bulk traffic (e.g., File Transfer Protocol (FTP)). For real time traffic, the controller can redirect a percentage of live traffic served by the non-canary versions of the containerized production environment to the canary versions.

In some embodiments, a controller of a containerized environment can enable different modes of canary testing. For example, the controller can initiate canary testing for validating basic functionality in the containerized production environment. Then the controller can enable canary testing for verifying data plane operations. This stage can comprise more sophisticated, pre-recorded, unique traffic patterns for determining how canary versions behave in a myriad of interaction scenarios in the production environment. Finally, the controller can deploy canary testing for the containerized production environment using live traffic. In some embodiments, performance, latency, hardware/network/storage resource utilization, or other metrics of canary versions can also be compared to those of non-canary versions to assist in evaluation of the canary versions.

FIG. 1 illustrates an example of a network 100 for implementing various embodiments of the present disclosure. It should be understood that, for the network 100 and any network discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network 100 can include any number or type of resources, which can be accessed and utilized by clients or tenants. The illustrations and examples provided herein are for clarity and simplicity.

The network 100 can include a network fabric 102, a Layer 2 (L2) network 104, an L3 network 106, a network controller 108, compute resources 110A and 110B (collectively, "110"), storage resources 112, and L4-L7 services 114. The network fabric 102 can include spine switches 116A and 116B (collectively, "116") and leaf switches 118A, 118B, 118C, 118D, and 118E (collectively, "118"). The spine switches 116 can connect to the leaf switches 118 in the network fabric 102. The leaf switches 118 can include access ports (or non-fabric ports) and fabric ports. The fabric ports can provide uplinks to the spine switches 116, while the access ports can provide connectivity to endpoints (e.g., the compute resources 110, the storage resources 112, the L4-L7 services, etc.), internal networks (e.g., the L2 network 104), or external networks (e.g., the L3 network 106).

The leaf switches 118 can reside at the edge of the network fabric 102, and can thus represent the physical network edge. For instance, in some embodiments, the leaf switches 118D and 118E can operate as border leaf switches in communication with edge routers 120A and 120B located in the external network 106. The border leaf switches 118D and 118E may be used to connect any type of external network device, service (e.g., firewall, deep packet inspector, traffic monitor, load balancer, etc.), or network (e.g., the L3 network 106) to the fabric 102.

Although the network fabric 102 is illustrated and described herein as a leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. In some embodiments, the leaf switches 118 can be top-of-rack switches configured according to a top-of-rack architecture. In other embodiments, the leaf switches 118 can be aggregation switches in any particular topology, such as end-of-row or middle-of-row topologies. In some embodiments, the leaf switches 118 can also be implemented using aggregation switches.

Moreover, the topology illustrated in FIG. 1 and described herein is readily scalable and may accommodate a large number of components, as well as more complicated arrangements and configurations. For example, the network may include any number of fabrics 102, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 102 can flow through the leaf switches 118. In some embodiments, the leaf switches 118 can provide endpoints (e.g., the compute resources 110 or the storage resources 112, etc.), services (e.g., the L4-L7 services 114), internal networks (e.g., the L2 network 104), or external networks (e.g., the L3 network 106) access to the network fabric 102, and can connect the leaf switches 118 to each other. In some embodiments, the leaf switches 118 can connect endpoint groups (EPGs) to the network fabric 102, internal networks (e.g., the L2 network 104), and/or any external networks (e.g., the L3 network 106). EPGs are groupings of applications, or application components, and tiers for implementing forwarding and policy logic. EPGs can allow for separation of network policy, security, and forwarding from addressing by using logical application boundaries. EPGs can be used in the network 100 for mapping applications in the network. For example, EPGs can comprise a grouping of endpoints in the network 100 indicating connectivity and policy for applications.

As discussed, the compute resources 110 can connect to the network fabric 102 via the leaf switches 118. For example, the compute resources 110A can connect directly to the leaf switches 118A and 118B, which can connect the compute resources 110A to the network fabric 102 and/or any of the other leaf switches. The compute resources 110B and storage resources 112 can connect to the leaf switches 118B and 118C via the L2 network 104. The compute resources 110B, storage resources 112, and the L2 network 104 make up a local area network (LAN). LANs can connect nodes over dedicated private communications links located in the same general physical location, such as a building or campus.

The WAN 106 can connect to the leaf switches 118D or 118E via the edge routers 120. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints can include any communication device or component, such as a computer, server, blade, hypervisor, virtual machine, container, process (e.g., running on a virtual machine), switch, router, gateway, host, device, external network, etc.

In some embodiments, the network 100 may connect to external networks of public cloud providers via the WAN 106 for additional compute, storage, and/or network resources in an architecture sometimes referred to as a hybrid cloud or multi-cloud. A hybrid cloud can include the combined compute, storage, and/or network resources of a private network or cloud (e.g., the network 100) and a public cloud to perform workloads of an operator of the network 100. A multi-cloud can combine compute, storage, and/or network resources of a private cloud with the resources of multiple public cloud providers.

In this example, the Cisco® Application Policy Infrastructure Controller (APIC™) may operate as the network controller 108. The APIC™ can provide a centralized point of automation and management, policy programming, application deployment, and health monitoring for the fabric 102. Here, the APIC™ can operate as a replicated synchronized clustered controller. In other embodiments, other configurations or software-defined networking (SDN) platforms can be utilized for managing the fabric 102.

Compute resources 110 can comprise hosts, including physical or bare metal servers, virtual machines, and/or containers, for running applications of the operator of the network 100. In some embodiments, a physical server may have instantiated thereon a hypervisor for creating and running one or more virtual machines. Some virtual machines may host one or more containers. In other embodiments, physical servers may run a shared kernel for hosting containers (e.g., bare metal containers). In yet other embodiments, physical servers can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions.

Storage resources 112 can comprise various technologies for storing the data of the operator of the network 100. Storage media can include hard disk drives (HDDs), solid state drives (SSD), hybrid storage arrays that incorporate Flash memory and HDDs, and/or other media. The storage resources can be organized as direct attached storage (DAS), network attached storage (NAS), storage area networks (SANs), or other storage infrastructure.

The L4-L7 services 114 can provide networking services for the network 100, such as network address translation (NAT), firewalling, Internet Protocol Security (IPSec), session border control (SBC), deep packet inspection (DPI), traffic monitoring, load balancing, etc. The L4-L7 services 114 can be implemented in hardware as physical appliances and/or in software using general-purpose CPUs (e.g., virtual appliances within virtual machines and/or containers). In this example, the network controller 108 can provide automatic service insertion based on policies defined by the network operator. The controller 108 can use L4-L7 service graphs (e.g., ordered sets of service function nodes between a set of endpoints and set of network service functions specified for an application) to push the needed configuration and security policies to the fabric 102, the L4-L7 services 114, and other infrastructure components of the network 100.

As seen in FIG. 1, containers play an increasingly important role in a modern network. Containers can be used to modernize a data center by packaging existing applications into containers to improve utilization of computing resources and reduce costs. Due to their portability, containers can also simplify different cloud migration strategies, such as hybrid cloud or multi-cloud architectures. Containers can also promote modern development strategies, such as continuous integration, delivery, and deployment (CI/CD), because of their isolated nature and robustness to rapidly changing environments. In addition, containers are lightweight by design and ideal for enabling services and microservices, whether building new services and microservices, or refactoring monolithic applications into smaller services or microservices.

Figure 2:
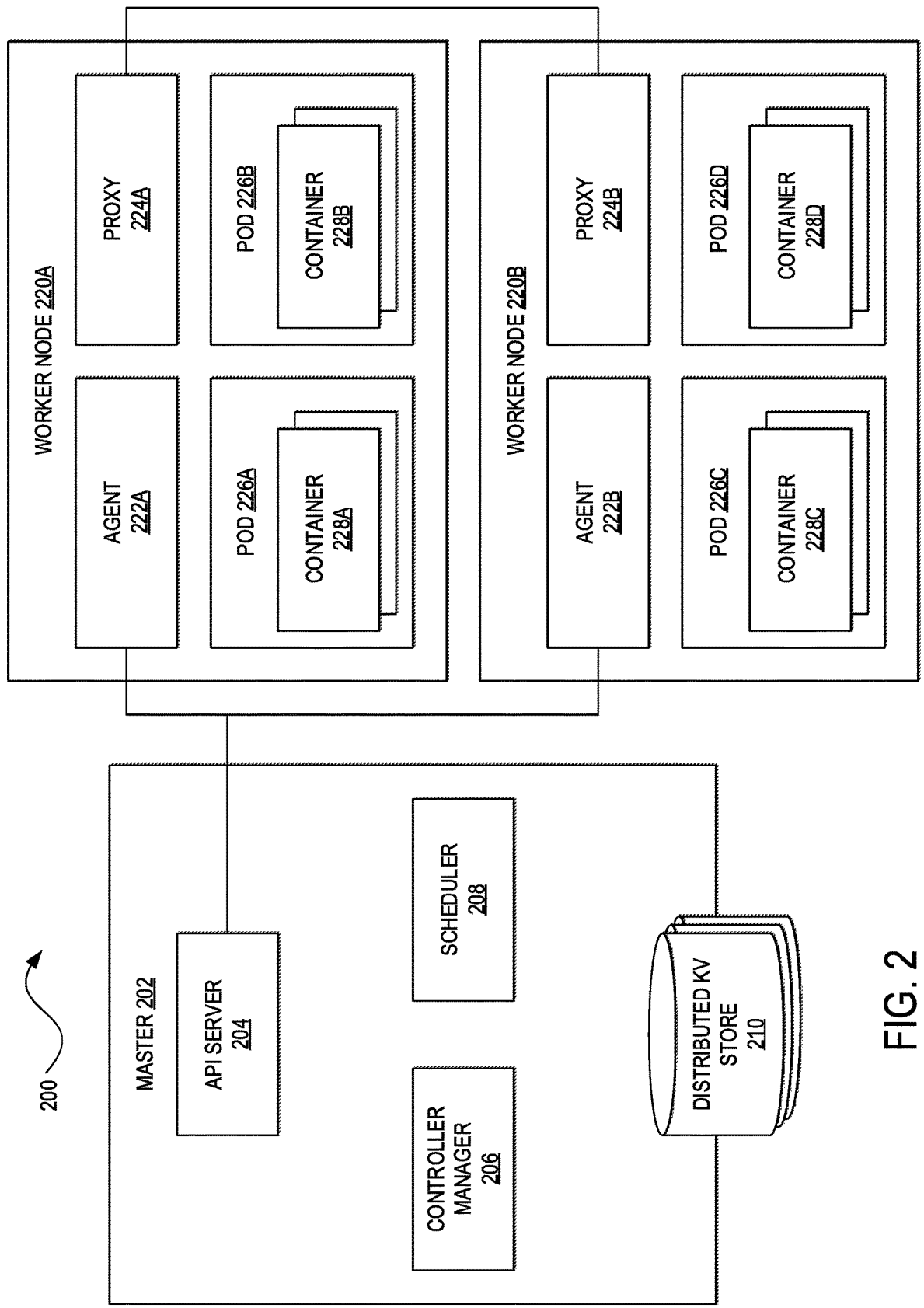
FIG. 2 illustrates an example of a container orchestration platform in accordance with an embodiment.

FIG. 2 illustrates an example of a container orchestration platform 200 for managing containers in a network (e.g., the network 100). One of ordinary skill in the art will understand that, for the container orchestration platform 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the container orchestrator platform 200 can correspond to the Kubernetes® (K8s) system from the Cloud Native Computing Foundation®. Kubernetes® is an open source container orchestration system for automating deployment, scaling, and management of application containers across clusters of hosts. However, other embodiments may deploy other container orchestration platforms, such as Docker Swarm® from Docker®, Inc., Apache Mesos® from the Apache® Software Foundation, or other container orchestrator without departing from the scope of the present disclosure.

The container orchestration platform 200 can comprise one or more clusters. A cluster is a collection of compute, storage, and networking resources that the container orchestration platform 200 can use to run the various workloads of a network. Each cluster can comprise one or more hosts (physical servers and/or virtual machines). Here, master 202 and worker nodes 220A and 220B (collectively, "220") can represent a single cluster. In this example, there is one master 202 but other embodiments may include multiple masters to provide high availability.

The master 202 can provide a control plane for a cluster. The master 202 can be responsible for the global, cluster-level scheduling of pods (set of one or more containers) and the handling of events (e.g., starting up a new pod when additional computing resources are needed). The master 202 can include an Application Programming Interface (API) server 204, a controller manager 206, a scheduler 208, and a distributed Key Value (KV) store 210. The master components can run on any host in the cluster but usually run on the same (physical or virtual) machine without worker nodes.

The API server 204 (e.g., kube-apiserver) can operate as the front-end of the control plane, and can expose the API (e.g., Kubernetes API) of the container orchestration platform 200. The API server 204 can scale horizontally (e.g., scale by deploying more instances) as it can be stateless and store data in the distributed KV store 210.

The controller manager 206 (e.g., kube-controller-manager, cloud-controller-manager) can be a collection of various managers rolled up into one binary. The controller manager 206 can include a node controller, replication controller, endpoints controller, service controller, volume controller, and others. The node controller can be responsible for noticing and responding when nodes go down. The replication controller can be responsible for maintaining the correct number of pods for every replication controller in the system. The endpoints controller can populate endpoints (e.g., pods). The service controller can be responsible for creating, updating, and deleting network services (e.g., firewalling, load balancing, deep packet inspection, etc.). The volume controller can be responsible for creating, attaching, and mounting volumes.

The scheduler 208 (e.g., kube-scheduler) can be responsible for scheduling pods into nodes. This can involve evaluation of resource requirements, service requirements, hardware/software policy constraints, node affinity and anti-affinity specifications, pod affinity and anti-affinity specifications, data locality, and deadlines, among other factors.

The distributed KV store (e.g., etcd) 210 is a high-availability distributed data store. The container orchestration platform 200 can use the distributed KV store 210 to store cluster state information. In a small, short-lived cluster, a single instance of the KV store 210 can run on the same host as other master components, but for larger clusters, the distributed KV store 210 may comprise a cluster of hosts (e.g., 3-5 nodes) for redundancy and high availability.

Worker nodes 220 can maintain running pods and provide a runtime environment (not shown) for the container orchestration platform 200. The container runtime can be responsible for running containers (e.g., Docker®, rkt from CoreOS®, Inc., runC from the Open Container Initiative™, etc.). Each of the worker nodes 220 can correspond to a single host, which can be a physical or virtual machine. Each worker node 220 can include an agent 222 (e.g., kubelet) and a proxy 224 (e.g., kube proxy, Open vSwitch (OVS)/Contiv netplugin, etc.).

The agent 222 can run on each node 220 in a cluster and ensure that containers (e.g., containers 228A, 228B, 228C, etc. (collectively, "228")) are running in a pod (e.g., pods 226A, 226B, 226C, etc. (collectively, 226)). The agent 222 can oversee communications with the master 202, including downloading secrets from the API server 204, mounting volumes, or reporting the status of the node 220 and each pod 226.

A pod is the unit of work in the container orchestration platform 200. Pods can help to manage groups of closely related containers that may depend on each other and that may need to cooperate on the same host to accomplish their tasks. Each pod 226 can include one or more containers 228. Pods can be scheduled together and run on the same machine. The containers 228 in each pod 226 can have the same IP address and port space; they can communicate using localhost or standard inter-process communication. In addition, the containers 228 in each pod 226 can have access to shared local storage on the node 220 hosting the pod. The shared storage can be mounted on each container 228.

The proxies 224 can be responsible for container networking, including low-level network housekeeping on each node, reflection of local services, TCP and UDP forwarding, finding cluster IPs through environmental variables or Domain Name System (DNS). In some embodiments, the container orchestration platform 200 may employ a networking model that relates how the nodes 220, pods 226, and containers 228 interact with one another, such as ensuring that containers can communicate with other containers without NAT, nodes can communicate with containers (and vice-versa) without NAT, and the IP address that a container sees itself as is the same IP address that others see it as. This networking model can assign IP addresses at the pod level such that containers within a pod share an IP address and port space. This networking model can also enable containers within a pod to reach other containers' ports on localhost.

The container orchestration platform 200 can enable intra-node communication or pod-to-pod communication within the same node via local filesystem, any IPC mechanism, or localhost. The container orchestration platform 200 can support various approaches for inter-node communication or pod-to-pod communication across nodes, including L2 (switching), L3 (routing), and overlay networking. The L2 approach can involve attaching an L2 network to a node's physical network interface controller (NIC) and exposing the pod directly to the underlying physical network without port mapping. Bridge mode can be used to enable pods to interconnect internally so that traffic does not leave a host unless necessary. The L3 approach may not use overlays in the data plane, and pod-to-pod communication can happen over IP addresses leveraging routing decisions made by node hosts and external network routers. Pod-to-pod communication can utilize Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for inter-node pod-to-pod communication.

In some embodiments, the container orchestration platform 200 can support labels and selectors. Labels are key-value pairs that can be used to group together sets of objects, such as pods. Labels can also be used to specify attributes of objects that may be meaningful and relevant to network users. There can be an N×N relationship between objects and labels. Each object can have multiple labels, and each label may be applied to different objects. Each label on an object may have a unique key. The label key can include a prefix and a name. The prefix can be optional. If the prefix exists, it can be separated from the name by a forward slash (/) and be a valid DNS subdomain. The prefix and the name can have specified maximum lengths (e.g., 253 and 63 characters, respectively). Names can start and end with an alphanumeric character (a-z, A-Z, 0-9) and include alphanumeric characters, dots, dashes, and underscores in between. Values can follow the same restrictions as names.

Label selectors can be used to select objects based on their labels, and may include equality-based selectors and set-based selectors. Equality (and inequality) based selectors can allow for selection of objects by key name or value. Matching objects must satisfy specified equality (= or ==) or inequality (!=) operators. Set-based selectors can enable selection of objects according to a set of values, including objects that are "in" or "not in" the set or objects having a key that "exists." An empty label selector can select every object in a collection. A null label selector (which may only be possible for optional selector fields) may select no objects.

In some embodiments, the container orchestration platform 200 may support container services. A container service is an abstraction which defines a logical set of pods and a policy by which to access them. The set of pods targeted by a container service can be determined by a label selector. Services can be published or discovered through DNS or environment variables. Services can be of different types, such as a ClusterIP, NodePort, LoadBalancer, or ExternalName. A ClusterIP can expose a container service on a cluster-internal IP such that the container service may only be reachable from within the cluster. A NodePort can expose a container service on each node's IP at a static port. A ClusterIP container service, to which the NodePort container service may route, can be automatically created. The NodePort container service can be contacted from outside the cluster by requesting <NodeIP>:<NodePort>. A LoadBalancer can expose a container service externally using a cloud provider's load balancer. NodePort and ClusterIP container services, to which the external load balancer routes, may be automatically created. An ExternalName can map a container service to the contents of a specified Canonical Name (CNAME) record in the DNS.

Figure 3:
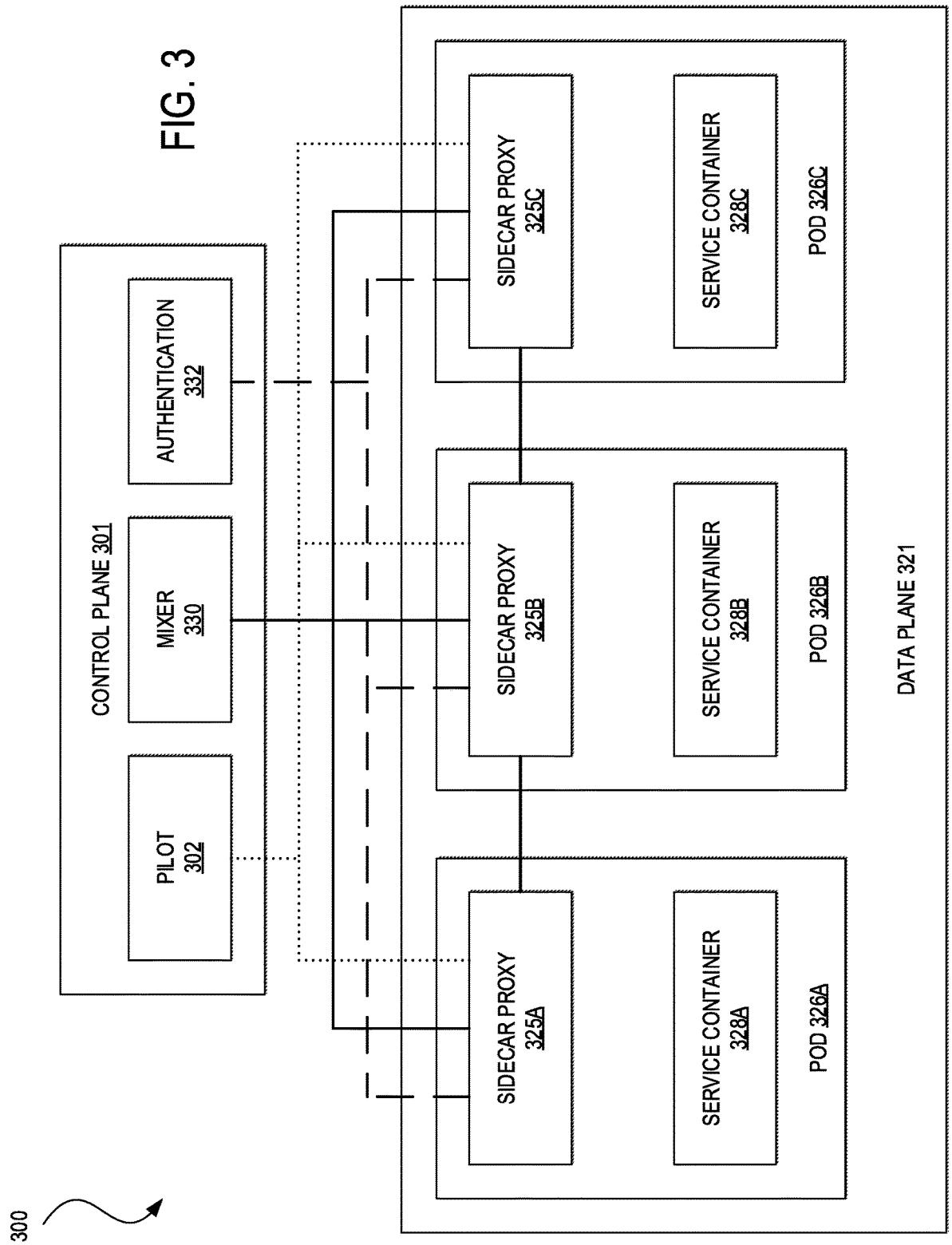
FIG. 3 illustrates an example of a containerized environment in accordance with an embodiment.

FIG. 3 illustrates an example of an architecture for a containerized environment 300 built with a container orchestration platform (e.g., the container orchestration platform 200 of FIG. 2). In some embodiments, the containerized environment 300 may be implemented using the open-source Istio platform with the Kubernetes® container orchestrator. However, other embodiments may utilize other container platforms (e.g., Linkerd™ from the Cloud Native Computing Foundation®, Conduit from Buoyant, Inc. of San Francisco, Envoy™ from The Linux Foundation®, Kata Containers from The Open Stack Foundation®, etc.) and/or other container orchestrators (e.g., Docker Swarm®, Apache Mesos®, etc.) without departing from the scope of the present disclosure.

The containerized environment 300 may be logically divided into a control plane 301 and a data plane 321. The control plane 301 can be responsible for managing and configuring traffic routing. In addition, the control plane 301 can enforce policy and collect telemetry. In this example, the control plane 301 can include a Pilot 302, a Mixer 330, and an Authentication component 332.

The Pilot 302 (which may correspond to the K8s® Master 202 of FIG. 2) can be used to manage the overall fleet of services or microservices running across a container cluster. The Pilot 302 can ensure that each of the independent and distributed microservices, which may be wrapped as service containers 328B, 328B, 328C (collectively, service containers 328) and inside pods 326A, 326B, 326C (collectively, pods 226), has the current view of the overall container topology and up-to-date routing rules. The Pilot 302 can also provide capabilities such as service discovery, RouteRule, and DestinationPolicy. RouteRule can enable finely grained request distribution. DestinationPolicy can help to address resiliency with timeouts, retries, circuit breakers, and so forth.

The Mixer 330 can enforce access control and usage policies across the containerized environment 300, and collect telemetry data from the data plane 321 and other services. The Mixer 330 can be used to create Access Control Lists (ACLs), apply rate-limiting rules, and capture custom metrics. In some embodiments, the Mixer 330 can have a pluggable backend architecture to interface with various host environments and infrastructure backends.

The Authentication component 332 can manage certificate signing, certificate issuance, and revocation/rotation. In some embodiments, the Authentication component 332 can issue x509 certificates to services and microservices, allowing for mutual Transport Layer Security (mTLS) between these services and microservices and transparent encryption of their traffic. In some embodiments, the Authentication component 332 may use service identity built into the underlying container orchestration platform to generate certificates. This identity can allow for policy enforcement.

The data plane 321 can comprise a set of intelligent proxies 325A, 325B, and 325C (collectively, "325") as sidecars. A sidecar is a container that can operate alongside an application container (e.g., the service containers 328) to provide the application container with additional capabilities. The sidecar proxies 325 can mediate and control network communication between services and microservices (along with the Mixer 330). In some embodiments, the sidecar proxies 325 may be implemented as Envoy™ Proxies. The sidecar proxies 325 can support load balancing for Hypertext Transfer Protocol Version 1.1 (HTTP/1.1), HTTP/2, QUIC, and general-purpose Remote Procedure Calls (gRPC). In addition, the sidecar proxies 325 can provide request-level metrics, tracing spans, active and passive health checking, and service discovery, among other tasks.

Figure 4:
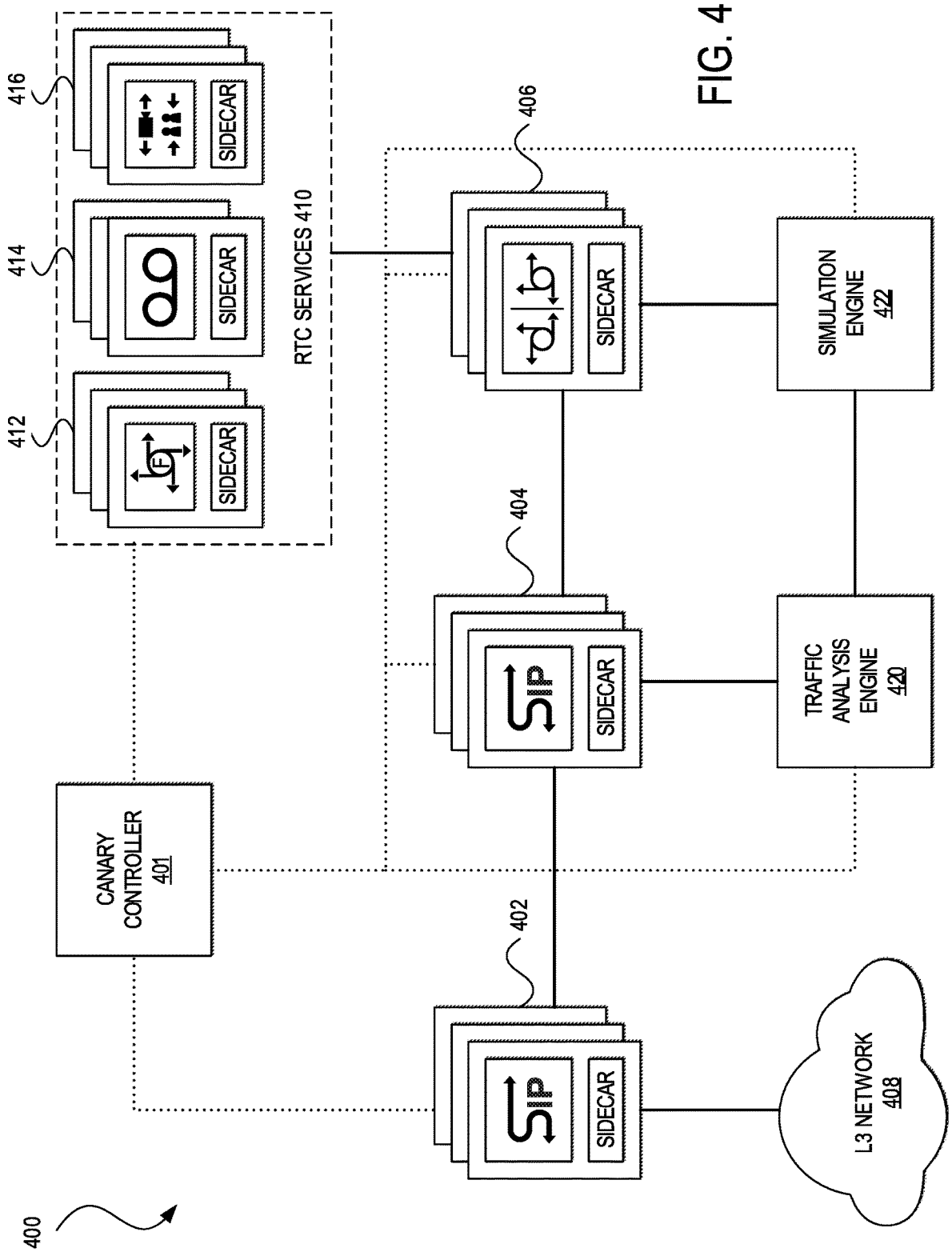
FIG. 4 illustrates an example of a containerized environment for providing real-time communications in accordance with an embodiment.

FIG. 4 illustrates an example of a containerized environment 400 for providing real-time communications in a network (e.g., the network 100 of FIG. 1). One of ordinary skill in the art will appreciate that the containerized environment 400 is but one example of a container deployment for implementing an embodiment of the present disclosure. Many other types of architectures may be used in other embodiments without departing from the scope of the present disclosure. For example, another embodiment may involve containers/pods for running element management systems (EMSs) and virtual network functions (VNFs) in a Network Function Virtualization (NFV) Management and Orchestration (MANO) system. Yet another embodiment may implement network service functions (e.g., firewalls, WAN and application accelerators, deep packet inspectors, lawful interceptors, load balancers, network address translators, and other network services) in a Service Function Chain (SFC) architecture using containers/pods. Still other embodiments may be implemented in various other environments without departing from the scope of the present disclosure.

In the example of FIG. 4, the containerized environment 400 can include a canary controller 401, an edge proxy service 402, a core proxy service 404, a Session Border Controller (SBC) service 406, Real-Time Communication (RTC) services 410, a traffic analysis engine 420, and a simulation engine 422. The canary controller 401 can be a centralized controller (e.g., the control plane 301 of FIG. 3) for provisioning the various elements of the containerized environment 400, controlling traffic routing, enforcing policy, collecting telemetry, and managing canary testing.

The edge proxy service 402 can comprise a cluster of container pods (e.g., the container pods 226 of FIG. 2 or the container pods 326 of FIG. 3) for handling ingress traffic received from and egress traffic sent to L3 network (e.g., the L3 network 106 of FIG. 1). Each container pod of the edge proxy service 402 can comprise a sidecar proxy (e.g., the sidecar proxies 325 of FIG. 3) and one or more application containers (e.g., the containers 228 of FIG. 2 or the containers 328 of FIG. 3), including one or more Session Initiation Protocol (SIP) application containers. SIP is a signaling protocol used for initiating, maintaining, modifying, and terminating real-time sessions related to video, voice, messaging, and other communications applications and services between two or more endpoints in a network (e.g., an IP network).

The edge proxy service 402 can receive incoming communications from the L3 network 408 and perform basic checks on the incoming communications, such as for syntactical correctness and source validation. Each basic check may be performed by a separate container of a pod, a separate pod within the same host, a separate host of the edge proxy service 402, or a combination of these configurations. After these basic checks, the edge proxy service 402 can route the validated communications to the core proxy service 404.

The core proxy service 404 can comprise a cluster of container pods for performing additional processing of network traffic. Each pod of the core proxy service 404 can comprise a sidecar proxy and one or more application containers, including one or more SIP application containers. After receiving the inbound communications from the edge proxy service 402, the core proxy service 404 can determine whether to route the communications further downstream (e.g., to the SBC service 406) or to reject the communications, such as due to locally defined policy, routing rules, and the like. If a decision is made to route the communications further downstream, the core proxy service 404 can select an instance of the SBC service 406 to further process the communications.

The SBC service 406 can manage the signaling and media streams involved in setting up, conducting, and tearing down telephone calls or other interactive media communications (e.g., sessions). This can include advanced session management and control features, such as bandwidth management, call admission control, quality of service (QoS), The SBC service 406 can also provide security features, such as access control, Network Address Translation (NAT) or firewall traversal, flow-specific encryption, Denial of Service (DoS) protection. The SBC service 406 is a back-to-back user agent that can make individual connections to participating devices. This can enable the SBC service 406 to provide signaling protocol conversions (e.g., between SIP and H.323), transport protocol conversions (e.g., between Transmission Control Protocol (TCP) and User Datagram Protocol (UDP)), call signaling normalization for interoperability between vendors (e.g., H.323 to H.323, SIP to SIP, etc.), protocol mediation to enable advanced features in multi-vendor environment, and security interworking between platforms that may use different forms of encryption (e.g., interworking between Secure Real-Time Transport Protocol (SRTP) and RTP).

In this example, the SBC service 406 can also route communications to the RTC services 410, such as a fax service 412, a voicemail service 414, and audiovideo conference service 416 for specific processing by each RTC application/service. The fax service 412, voicemail service 414, and video conference service 416 can each comprise a cluster of container pods, and each pod can include a respective RTC application container (e.g., telephony, fax, voicemail, email, instant messaging, conferencing, etc.) and a sidecar proxy. The SBC service 406 can receive processing results from the RTC services 410 for transmission to the core proxy service 404.

In some embodiments, all request/response transactions routed to and from the core proxy service 404 for communications may be copied to the traffic analysis engine 420 for recording and analyzing network traffic flowing through the core proxy service 404. Although the traffic analysis engine 420 and the simulation engine 422 are not shown in this example to include sidecar proxies, other embodiments may configure a traffic analysis engine and/or simulation engine to include sidecar proxies or other network agents. In addition, the traffic analysis engine 420 and simulation engine 422 are shown as separate entities in this example but other embodiments may configure a traffic analysis engine and simulation engine as a single entity.

In some embodiments, the traffic analysis engine 420 can parse the SIP messages it receives, extract the SIP interaction context from each message, and build patterns of unique SIP interactions flowing through the containerized environment 400. For example, as a result of extracting context from SIP messages fed to it, the traffic analysis engine 420 can build various SIP interaction patterns, such as a SIP audio call with mid-session escalation to video, a SIP audio and video call with mid-session SIP REFER handling, or a SIP audio call with mid-session escalation to fax followed by de-escalation to audio, among others.

These diverse interaction patterns can then be fed to the simulation engine 422. In an embodiment, the SBC service 406 can include a first version and a second version (e.g., a canary version) operating concurrently in a production environment. Unlike current approaches for canary testing that may be limited to forwarding a fraction of traffic to the canary version (e.g., 5% of traffic) and the remaining traffic to the production version (e.g., 95% of traffic), the simulation engine 422 can generate actual traffic patterns seen over a reasonable time frame within the containerized environment 400 and forward the simulated traffic to the canary version of the SBC service 406. The effectiveness and robustness of the canary release can then be gauged based on the results of processing from the canary version of the SBC service 406 against the provided patterns. In this manner, the containerized environment 400 can enable more rapid deployment of an updated application, service, or microservice to the production environment. For example, unlike incremental canary testing, the stability of the updated application, service, or microservice can be immediately determined from expected and operational traffic loads. In addition, as the simulation engine 422 can simulate traffic corresponding to infrequently occurring traffic patterns, it can be certain that the canary version will be tested against edge cases that may not otherwise be tested via incremental canary testing. The simulation engine 422 can also generate a greater diversity of traffic patterns than incremental canary testing.

In this example, the simulation engine 422 can operate as both a traffic source by generating and transmitting synthetic traffic derived from traffic interaction patterns received from the traffic analysis engine 420 and a traffic sink by receiving processed synthetic traffic from the RTC services 410. This configuration enables canary testing of the SBC service 406. In other embodiments, a simulation engine can include separate sources and sinks and/or may be located in other locations of a network to facilitate canary testing of a different scope of a containerized environment or different services and microservices of the containerized environment. For example, in an embodiment, a simulation engine may be located between the edge proxy service 402 and the L3 network 408 to enable canary testing of the services and microservices of the containerized environment 400. In another embodiment, a simulation engine may be located between the SBC service 406 and the RTC services 410 to enable canary testing of the RTC services 410. In yet another embodiment, a simulation engine may be located between the SBC service 406 and the fax service 412 to enable canary testing of the fax service 412.

Figure 5:
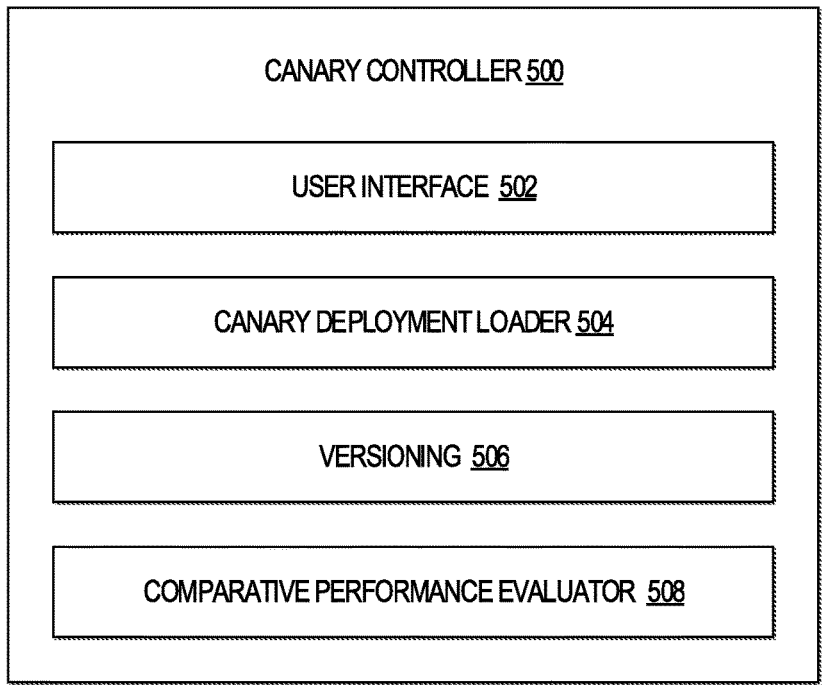
FIG. 5 illustrates an example of a controller for canary testing in accordance with an embodiment.

FIG. 5 illustrates an example of a canary controller 500 for enabling a network administrator to deploy canary versions of one or more containers of a containerized environment (e.g., the containerized environment 400) or one or more canary versions of the services or microservices (e.g., the services/microservices 402, 404, 406, 410, 412, 414, and/or 416) in a production environment. The canary controller 500 can be one way of implementing the canary controller 401. In this example, the canary controller 500 may be integrated with a network controller (e.g., the network controller 108), a controller of a container orchestration platform (e.g., the master 202), and/or a controller for a containerized environment (e.g., the control plane 301 of FIG. 3). For instance, the canary controller 500 can execute as a container in a physical or virtual host including a Pilot (e.g., the Pilot 302 of FIG. 3), a Mixer (e.g., the Mixer 330 of FIG. 3), and an Authentication component (e.g., the Authentication component 332 of FIG. 3). Alternatively or in addition, the canary controller 500 can execute as a container in a physical or virtual host including a master node (e.g., the master 202 of FIG. 2). Alternatively or in addition, the canary controller 500 can execute as a container in a physical or virtual host including a network controller (e.g., the network controller 108). In other embodiments, the canary controller 500 can be a standalone set of applications, application, set of services, service, or set of micro services.

The canary controller 500 can include a user interface 502, a canary deployment loader 504, a versioning element 506, and a comparative performance evaluator 508. The user interface 502 can comprise various interfaces for enabling communications between clients and a containerized environment (e.g., the containerized environment 400). These interfaces may include a graphical user interface (e.g., a web-based interface; standalone application or an application native to a client device, such as a desktop application or a mobile app; etc.); a Network Configuration Protocol (NETCONF) interface, a restful state transfer (REST) application programming interface (API), or other API; a command-line interface; or other suitable interface for exchanging data between clients and the containerized environment.

The user interface 502 can receive requests from various clients, and in response to the received requests, the canary controller 500 can access its components to communicate appropriate responses to the requesting clients. For example, the user interface 502 can enable a network administrator to initiate canary testing of a containerized environment and to specify the deployment for such testing via the canary deployment loader 504.

In some embodiments, a network administrator may utilize the user interface 502 to cause the canary deployment loader 504 to configure a containerized production environment for canary testing of all or many containers of the environment. In addition, the canary deployment loader 504 can specify how to deploy the containers of the containerized production environment, such as to deploy canary versions of services or microservices on a one-to-one basis in each host including current non-canary versions of the services and microservices. For example, if non-canary versions of microservices A, B, and C run within hosts X, Y, Z, respectively, then the canary deployment loader 504 can instantiate canary versions of the corresponding microservices, A', B', and C', for execution within hosts X, Y, and Z, respectively.

As another example, the canary deployment loader 504 can provision the canary versions of services and microservices and the corresponding non-canary versions of the services and microservices within non-overlapping hosts. For instance, if non-canary versions of microservices A, B, and C run within hosts X, Y, Z, respectively, then the canary deployment loader 504 can populate canary versions of the corresponding microservices, A', B', and C', for execution within hosts Z, Y, X, respectively; within hosts I, J, and K, respectively; or within another permutation such that microservices A and A' do not run on the same host, microservices B and B' do not run on the same host, and microservices C and C' do not run on the same host.

As another example, the canary deployment loader 504 can deploy the canary versions of services or microservices and the corresponding non-canary versions of the services or microservices within partially overlapping hosts. For instance, if non-canary versions of microservices A, B, and C run within hosts X, Y, Z, respectively, then at least one of the canary versions of the corresponding microservices, A', B', and C', may also run within hosts X, Y, and Z, respectively, and at least one of the microservices A', B', and C' do not run on the same hosts as A, B, and C, respectively.

As another example, the canary deployment loader 504 can deploy the canary versions of services and microservices to optimize for performance of the canary versions. For instance, in an environment with hosts having heterogeneous computing resources (e.g., different CPU speeds, amounts of cache, amounts of main memory, bus speeds, types of hard drive, etc.), the canary deployment loader 504 can provision the canary versions within high-performance hosts. Alternatively or in addition, the canary controller 500 can monitor the responsiveness (or other performance metrics) of hosts of the non-canary versions of the services and microservices (e.g., via a Mixer, such as the Mixer 330 of FIG. 3) and provision the canary versions of the services and microservices in the hosts according to these performance metrics.

As another example, the canary deployment loader 504 can deploy the canary versions of services and microservices to optimize for performance of the non-canary versions of the services and microservices. Hence, the canary controller 500 can deploy the non-canary versions of the services and microservices in high-performance hosts and/or deploy the canary versions of services and microservices in the hosts having fewer computing resources. Alternatively or in addition, the canary controller 500 can collect telemetry (e.g., amount of packet loss, bit rate, throughput, transmission delay, availability, jitter, etc.) from the non-canary versions of the services and microservices and allocate the non-canary versions of the services and microservices and/or the canary versions according to the telemetry to maximize performance of the non-canary versions.

As another example, the canary deployment loader 504 can deploy the canary versions of services or microservices for minimal performance (e.g., for simple functionality verification). This can involve the canary deployment loader 504 deploying the canary versions to minimize effects on the performance of the non-canary versions. Alternatively or in addition, this can involve the canary deployment loader 504 assigning low Quality of Service (QoS) levels or otherwise deprioritizing traffic handled by the canary versions.

In some embodiments, the user interface 502 can enable a network administrator to configure a containerized environment for canary testing of a specific service or micro service or set of services or microservices. In addition, the network administrator can utilize the user interface 502 to specify different versions of services or microservices for canary testing. The canary controller 500 can include the versioning element 506 for configuring different canary versions of services or microservices in a containerized environment. In some embodiments, the versioning element 506 can evaluate whitelist rules or blacklist rules for determining a suitable combination of canary versions of the services or microservices to provision and execute in the containerized environment. Whitelist rules can prohibit combining different canary versions by default, and may allow a set of canary versions of the services and microservices to be combined if a rule exists that permits the combination. For example, the versioning element 506 may allow canary versions of microservices A', B', and C' to be instantiated for execution together in the containerized environment if there is a rule that allows for this combination but may not allow A, B, and C' to be instantiated for execution together if there is no rule for this combination. Blacklist rules, on the other hand, can allow any combination of canary versions of the services or microservices by default, and may prohibit combining a set of canary versions if a rule expressly disallows that particular combination. For example, the versioning element 506 may allow canary versions of microservices A', B', and C' to be provisioned and executed together because there is no rule prohibiting this combination but may not allow A', B, and C to be provisioned and executed together because there is a rule expressly forbidding this combination.

In some embodiments, the user interface 502 can enable a network administrator to specify a type of traffic to transmit to/from one or more canary versions of services and microservices of a containerized environment. The canary controller 500 can interface with a traffic analysis engine (e.g., the traffic analysis engine 420 of FIG. 4 and traffic analysis engine 600 of FIG. 6) to determine the types of traffic flowing through the containerized environment. The canary controller 500 and/or the traffic analysis engine can interface with a simulation engine (e.g., the simulation engine 422 of FIG. 4) and direct a specific type or specific types of traffic through the containerized environment for canary testing. For example, traffic classes can include broad spectrum traffic and real time traffic. If a network administrator requests for broad spectrum traffic to be transmitted to/from canary versions of services and microservices, previously recorded patterns can be generated and forwarded to the canary versions for evaluation of certain events and types of traffic, such as initial sign-up for a containerized application, service, microservice, or other container deployment; peak-time versus off-peak traffic; east-west versus north-south traffic; among other traffic patterns. Alternatively or in addition, if a network administrator requests for real time traffic to be transmitted to/from the canary versions of the services or microservices, the canary controller 500 can direct a percentage of live traffic that is currently served by the containerized production environment to the canary versions and the remaining live traffic to the non-canary versions of the containerized production environment.

In other embodiments, the user interface 502 can enable a network administrator to forward synthetic traffic corresponding to finer grained classes to canary versions of services and microservices of a containerized production environment. Table 1 sets forth an example of different types of traffic classes, such as web browsing, Voice over IP (VoIP), network, multimedia/streaming, Domain Name System (DNS), chat, email, File Transfer Protocol (FTP), attack/threat, peer to peer, and gaming, among other traffic classes, and their corresponding applications.

TABLE 1

Examples of Traffic Classes

| Traffic Class | Example Applications |
|---|---|
| Web browsing | HTTP, HTTPS, QUIC |
| VoIP | H.323, SIP, Web Real Time Communications (WebRTC) |
| Networking | Simple Network Management Protocol (SNMP), Network Time Protocol (NTP), Secure Shell (SSH), Telnet |

TABLE 1-continued

Examples of Traffic Classes

| Traffic Class | Example Applications |
| --- | --- |
| Multimedia; Streaming | RTP, RSTP |
| DNS | DNS |
| Chat | Extensible Messaging and Presence Protocol (XMPP), Cisco Jabber ® |
| Email | Internet Message Access Protocol (IMAP), Post Office Protocol (POP), Simple Main Transfer Protocol (SMTP) |
| Bulk | FTP |
| Attack; Threat | Address scans, Port scans, TCP-syn floods, UDP floods, |
| Peer to peer | File sharing, cryptocurrency |
| Gaming | Minecraft ®, Fortnite ® |

In some embodiments, the user interface 502 can enable a network administrator to initiate different stages of canary testing in a containerized production environment. These stages can include canary testing for basic functionality, data plane operations, and live traffic. The basic functionality canary testing stage can involve verifying basic operation of the canary versions of services and microservices in the containerized production environment. The data plane operations canary testing stage can comprise more sophisticated, pre-recorded, unique traffic patterns for evaluating how the canary versions perform in a variety of interactions while using traffic patterns that simulate real traffic in the containerized production environment. The live traffic canary testing stage can be deployed for the whole containerized production environment using live traffic. In some embodiments, the canary controller 500 can include a comparative performance evaluator 508 for comparing performance, latency, CPU/memory/storage/networking resource utilization, and other metrics between canary versions and non-canary versions of the services and microservices in a containerized production environment.

Figure 6:
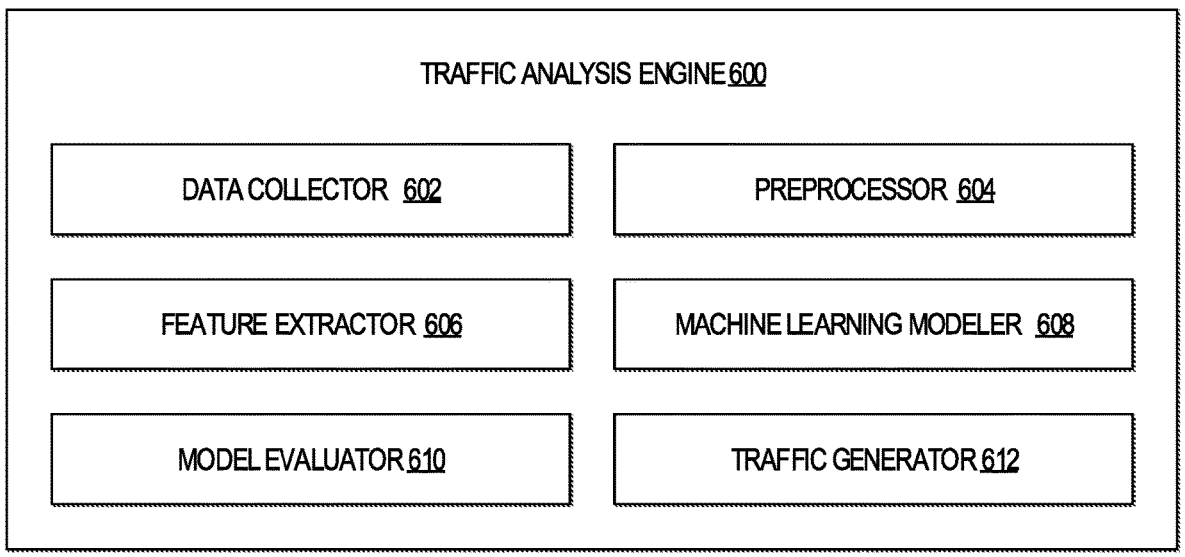
FIG. 6 illustrates an example of a traffic analysis engine in accordance with an embodiment.

FIG. 6 illustrates an example of a traffic analysis engine 600 for monitoring traffic, extracting traffic interaction context, and building traffic interaction patterns. The traffic interaction patterns can be used for canary version texting via a canary controller (e.g., the canary controller 500 of FIG. 5). The traffic analysis engine 600 can include a data collector 602, a preprocessor 604, a feature extractor 606, a machine learning modeler 608, a model evaluator 610, and a traffic generator 612. Although the elements of the traffic analysis engine 600 are shown to be separate and distinct components in this example, other embodiments may integrate one or more of the elements, divide a component of the traffic analysis engine 600 into additional components, divide and combine components into other logical units, or otherwise utilize a different configuration for the traffic analysis engine 600. For example, in other embodiments, the traffic generator 612 or some of its components may reside in a simulation engine (e.g., the simulation engine 422 of FIG. 4).

The data collector 602 can capture network traffic data, such as frame or packet traces, session logs, and performance metrics from different layers of the Open Systems Interconnection (OSI) model, the TCP/IP model, or other network model. The data collector 602 may record the network traffic data at various levels of granularity, such as per packet, flow, session, or other level of granularity. In some embodiments, the data collector 602 may collect the network traffic data in different phases. For example, the machine learning modeler 608 may implement supervised learning such that the data collector 602 may capture network traffic data during an offline or training stage during which the parameters of the machine learning modeler 608 are determined and an online or evaluation stage during which the machine learning modeler 608 is applied to new traffic data instances.

The preprocessor 604 can perform initial processing tasks on the data captured by the data collector 602 for input to the feature extractor 606. The preprocessing tasks can include assembly, filtration, data type conversion, normalization, discretization, and/or missing value completion. Assembly can involve constructing units of data at a specified level of granularity from raw traffic data, such as building packets into segments, segments into application layer protocol messages (e.g., unidirectional flows, requests, or responses), messages into connections (e.g., bidirectional flows or request/response pairs), connections into sessions, and so forth. For example, the traffic analysis engine 420 of FIG. 4 may analyze traffic data at the level of granularity of an SIP call or session, and assembly can involve constructing the SIP calls or sessions from raw traffic data. Other embodiments may utilize units of network traffic data of coarser granularity (e.g., real time traffic, TCP/IP traffic, VoIP traffic, etc.) or units of network traffic data of finer granularity (e.g., connections, messages, segments, packets, etc.).

Filtration can involve removing extraneous or duplicative data from raw network traffic data. For example, in some embodiments, the preprocessor 604 can eliminate artifacts from the network and transport layer when reassembling TCP and UDP communication streams.

Data type conversion can involve mapping raw data from one data type to another. For example, raw data may include numeric data and categorical data (e.g., the protocol of a packet can take values such as TCP, ICMP, Telnet, UDP, etc.). Some machine learning techniques may work with either numeric data or categorical data but not both. Thus, in some embodiments, the preprocessor 604 can convert raw data to a form usable with a particular machine learning technique (e.g., converting numeric data to categorical data or vice versa).

Normalization can involve equalizing or reweighting feature values to reflect their relative importance. For example, not all parameters or feature values may be of equal importance, or their value ranges may be highly variable. In some embodiments, the preprocessor 604 can equalize, reweight, or otherwise adjust raw data as a preprocessing step.

Discretization can involve transforming continuous values into discrete values. For example, network traffic data may have continuous valued attributes such as the number of packets, the number of bytes, and the duration of a session. In some embodiments, the preprocessor 604 can transform continuous valued attributes into distinct binary values or ranges.

The feature extractor 606 can receive preprocessed network traffic data and extract its features or discriminative characteristics. A feature is generally a quality of a unit of network traffic data that can define the unit in part and that may be used to compare the similarities or differences between units. Some examples of features for network traffic data include packet header or flow fields, such as a source address, source port, destination address, destination port, protocol type, or class of service, among others; content-based features (e.g., features within the payload, such as specific tokens or words in the payload); time-based features (e.g., round-trip time (RTT), inter-arrival time (IAT) for request/response pairs or packets, number of connections to the same host during a time interval, etc.); and connection- or session-based features (e.g., number of packets, number of bytes, number of flows, bandwidth usage, latency, packet loss, jitter, etc.). Table 2 sets forth different levels of granularity of network traffic data that the traffic analysis engine 600 can capture and various examples of features that the feature extractor 606 may acquire from the network traffic data.

In k-means clustering, a number of n data points are partitioned into k clusters such that each point belongs to a cluster with the nearest mean. The algorithm proceeds by alternating steps, assignment and update. During assignment, each point is assigned to a cluster whose mean yields the least within-cluster sum of squares (WCSS) (e.g., the nearest mean). During update, the new means is calculated to be the centroids of the points in the new clusters. Convergence is achieved when the assignments no longer change. One variation of k-means clustering dynamically adjusts the number of clusters by merging and splitting clusters according to predefined thresholds. The new k is used as the expected number of clusters for the next iteration (e.g., ISODATA). Another variation of k-means clustering uses real data points (medoids) as the cluster centers (e.g., PAM).

Hierarchical clustering methods sort data into a hierarchical structure (e.g., tree, weighted graph, etc.) based on a similarity measure. Hierarchical clustering can be categorized as divisive or agglomerate. Divisive hierarchical clustering involves splitting or decomposing "central" nodes of

TABLE 2

Examples of Network Traffic Features

| Network Data Unit | Examples of Features |
| --- | --- |
| Packet | Protocol, length, time to live (TTL), source address, source port, destination address, destination port, TCP flags, content type (e.g., coarse-grained, such as text, binary, encrypted, etc. or fine-grained, such as text, image, audio, video, compressed, base64-encoded image, base64-encoded text, etc.) |
| Flow (Unidirectional) | Protocol, source address, source port, destination address, destination port, flow duration, content type, flow volume in bytes and packets, packet statistics (minimum, mean, maximum, standard deviation, etc.), packet inter-arrival times (minimum, mean, maximum, standard deviation, etc.) |
| Bidirectional Flow; Request/Response Pair; Connection | Source address, source port, destination address, destination port, flow duration, flow volume in bytes and packets, packet statistics (minimum, mean, maximum, standard deviation, etc.), packet inter-arrival times between packets or request/response pairs (minimum, mean, maximum, standard deviation, etc.), connection duration |
| Session | Session duration, Number of request/response pairs or connections, Throughput distribution |

The feature extractor 606 can also build feature vectors or other data structures for representing units of network data. This can involve encoding or assembling the feature values of a network data instance to generate samples for input to the machine learning modeler 608.

The machine learning modeler 608 can determine the parameters and functions (e.g., a machine learning model) for identifying the traffic class or cluster of a network data instance and to determine the distribution of the types of traffic flowing through a containerized production environment. The machine learning modeler 608 can utilize unsupervised or supervised methods for determining the model to cluster or classify the network data instances and the distribution of network traffic clusters or classes.

In unsupervised learning, the input data set may not be pre-labeled, and the machine learning modeler 608 can apply the input data set to a machine learning algorithm to learn how samples (e.g., network data instances or network traffic feature vectors) may be similar to one another and the features that may be especially cogent for distinguishing similarities and differences among the samples. Some examples of unsupervised learning techniques include k-means clustering, hierarchical clustering, density-based clustering, and grid-based clustering, among others.

the hierarchical structure where the measure of "centrality" can be based on "degree" centrality, (e.g., a node having the most number of edges incident on the node or the most number of edges to and/or from the node), "betweenness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering takes an opposite approach from divisive hierarchical clustering. Instead of beginning from the top of the hierarchy to the bottom, agglomerative clustering traverses the hierarchy from the bottom to the top. In such an approach, clustering may be initiated with individual nodes and gradually combine nodes or groups of nodes together to form larger clusters. Certain measures of the quality of the cluster determine the nodes to group together at each iteration. A common measure of such quality is graph modularity.

Density-based clustering is premised on the idea that data points are distributed according to a limited number of probability distributions that can be derived from certain density functions (e.g., multivariate Gaussian, t-distribution, or variations) that may differ only in parameters. If the distributions are known, finding the clusters of a data set becomes a matter of estimating the parameters of a finite set of underlying models. Expectation Maximization (EM) is an example of density-based clustering and involves iterations for finding the maximum likelihood or maximum a posteriori estimates of parameters in a statistical model, where the model depends on unobserved latent variables. The EM iterations alternate between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

Grid-based clustering divides a data space into a set of cells or cubes by a grid. This structure is then used as a basis for determining the final data partitioning. Examples of grid-based clustering include Wave Clustering and Statistical Information Grid (STING). Wave clustering fits the data space onto a multi-dimensional grid, transforms the grid by applying wavelet transformations, and identifies dense regions in the transformed data space. STING divides a data space into rectangular cells and computes various features for each cell (e.g., mean, maximum value, minimum value, etc.). Features of higher level cells are computed from lower level cells. Dense clusters can be identified based on count and cell size information.

Supervised learning methods operate on pre-labeled data. The machine learning modeler 608 can acquire the pre-labeled data, classified according to predetermined criteria, to learn the model (e.g., extrapolate the features and feature values) for mapping new unclassified samples to one or more classifications (e.g., traffic classes). Some examples of supervised learning algorithms include k-nearest neighbor (a variation of the k-means clustering algorithm discussed above), Naïve Bayesian classifiers, boosting, perceptrons and neural networks, decision trees and random forests, and support vector machines (SVMs), among others.

Naïve Bayesian classifiers are a family of probabilistic classifiers based on Bayes' theorem with strong assumption of independence among features. Bayes' theorem posits that the probability of x given that z already exists or has occurred equals the probability of x and z happening together divided by the probability of z. Formally, this can be referred to as the posterior probability density function p(x|z):

$$p(x|z)=(p(z|x)p(x))/p(z), \quad \text{(Equation 1)}$$

The optimization criterion of Bayes, minimum risk or maximum posterior expectation, is applicable when it is possible to quantify cost if estimates differ from true parameters and the expectation of the cost is acceptable as an optimization criterion. Cost function $C(\hat{x}|x): \mathbb{R}^M \to \mathbb{R}^N$ can represent a true cost. However, it may be difficult to quantify cost accurately and it is oftentimes more practical to select a cost function whose mathematical treatment is not overly complex and to assume that the cost function depends on the difference between the estimated and true parameters, such as by computing the estimation error $e=\hat{x}-x$. Given these assumptions, some embodiments may utilize the minimum means square error (MMSE) estimator as a Bayesian estimator. MMSE can be formally defined as:

$$\hat{x}_{MMSE}z=E[x|z]=\int_x xp(x|z)dx \quad \text{(Equation 2)}$$

Other embodiments may utilize the maximum a posteriori (MAP) estimator as the Bayesian estimator. MAP can be defined as:

$$\hat{x}_{MAP}z = \text{argmax}_x\left\{\frac{p(z|x)p(x)}{p(x)}\right\} = \text{argmax}_x\{p(z|x)p(x)\} \quad \text{(Equation 3)}$$

Still other embodiments may utilize maximum likelihood estimation (MLE). MLE is based on the observation that in MAP estimation, the peak of p(z|x) is when p(x) is almost constant. This can be especially true if little prior knowledge is available. In these cases, the prior density p(x) does not affect the position of the maximum very much. Discarding p(x) and maximizing the function p(z|x) leads to the MLE:

$$x_{MLE}z=\text{argmax}_x\{p(z|x)\} \quad \text{(Equation 4)}$$

Boosting methods attempt to identify a highly accurate hypothesis (e.g., classifier having a low error rate) from a combination of many "weak" hypotheses (e.g., classifiers having substantial error rates). Given a data set comprising examples within a class and not within the class and weights based on the difficulty of classifying an example and a weak set of classifiers, boosting generates and calls a new weak classifier in each of a series of rounds. For each call, the distribution of weights is updated to reflect the importance of examples in the data set for the classification. On each round, the weights of each incorrectly classified example are increased, and the weights of each correctly classified example is decreased so the new classifier focuses on the difficult examples (i.e., those examples have not been correctly classified). Example implementations of boosting include Adaptive Boosting (AdaBoost), Gradient Tree Boosting, or XGBoost.

Neural networks are inspired by biological neural networks and comprise an interconnected group of functions or classifiers (e.g., perceptrons) that process information using a connectionist approach. Neural networks change their structure during training, such as by merging overlapping detections within one network and training an arbitration network to combine the results from different networks. Some examples of neural network algorithms include the multilayer neural network, the auto associative neural network, the probabilistic decision-based neural network (PDBNN), and the sparse network of winnows (SNOW).

Decision trees use a tree-like graph or model of decisions and their possible consequences. Internal nodes can represent tests on features, branches can represent outcomes of the tests, and leaf nodes can represent a class label. A network traffic data instance is walked through the decision tree from root to leaf, and the label of the leaf node is the traffic class for the network traffic data instance. Some examples of decision tree algorithms include Classification and Regress Trees (CART), Iterative Dichotomiser 3 (ID3), C4.5, and RepTree.

Random forests rely on a combination of decision trees in which each tree depends on the values of a random vector sampled independently and with the same distribution for all trees in the forest. A random forest can be trained for some number of trees t by sampling n cases of the training data at random with replacement to create a subset of the training data. At each node, a number m of the features are selected at random from the set of all features. The feature that provides the best split is used to do a binary split on that node. At the next node, another number m of the features are selected at random and the process is repeated.

SVMs involve plotting data points in n-dimensional space (where n is the number of features of the data points) and identifying the hyper-plane that differentiates classes and maximizes the distances between the data points of the classes (referred to as the margin).

In some embodiments, the machine learning modeler 608 can determine a machine learning model per traffic class. Each machine learning model may be derived using the same machine learning algorithm or different machine learning algorithms. For example, in an embodiment, the machine learning modeler 608 can generate a random forest classifier for identifying a SIP audio call with mid-session escalation to audio, a k-means clusterer for identifying a SIP audio and video call with mid-session SIP refer handling, a support vector machine for identifying a SIP audio call with mid-session escalation to fax, and so forth. In other embodiments, the machine learning modeler 608 can determine a machine learning model per traffic class for identifying network traffic classes of coarser granularity (e.g., real time traffic, TCP/IP traffic, VoIP traffic) or finer granularity (e.g., bi-directional flows or connections, unidirectional flows or messages, segments, packets, etc.). In still other embodiments, the machine learning modeler 608 can determine a multi-class or multi-cluster model capable of identifying multiple types of network traffic. In still other embodiments, the machine learning modeler 608 can use a hybrid or hierarchical approach by determining one or more models for classifying or clustering traffic classes of coarser granularity and one or more models for classifying or clustering traffic classes of finer granularity.

After the machine learning modeler 608 determines the model or models for clustering or classifying network traffic, the model evaluator 610 can learn the distribution of the traffic clusters or classes by applying new network traffic data to the model or models. The traffic generator 612 can receive the model or models and the traffic distribution information to generate simulated traffic corresponding to actual network traffic captured by the traffic analysis engine 600. The traffic generator 612 can generate traffic at various levels of granularity, including frame-level, packet-level, flow-level, stream-level, application-level, and system-level. Frame-level and packet-level generators can create single frames or packets respectively having specified characteristics (e.g., protocol, source, destination, size, etc.). Flow-level generators can produce bursts of packets having specified traffic qualities (e.g., volume, packet inter-arrival times). Stream-level generators can be similar to flow-level generators but can simulate bi-directionality. Application-level generators can simulate application specific behaviors. System-level generators can simulate traffic for an entire network. Table 3 sets forth examples of implementations of network traffic generators of various levels of granularity.

TABLE 3

Examples of Traffic Generators

| Type | Name | Description |
| --- | --- | --- |
| Frame-level generator | packETH | A tool for creating Ethernet frames and IP packets |
| Packet-level generator | ipgen | Raw socket programming tool for transmitting TCP, UDP, or ICMP packets |
| Packet-level generator | Packet Generator | A libnet based tool for creating custom packets |
| Packet-level | Pktgen-DPDK | DPDK based packet generator |
| Packet-level generator | MoonGen | DPDK based packet generator |
| Packet-level | pkt-gen | A netmap based packet generator |
| Packet-level | pfq-gen | A PFQ based packet generator |
| Packet-level | zsend | PF_RING ZC packet generator |
| Flow-level | Multi-Generator (MGEN) | Flow-level generator supporting different distributions of packet inter-arrival times and sizes |
| Flow-level | Realtime UDP Data Emitter (RUDE)/Collector for RUDE (CRUDE) | Kernel-level UDP flow generator |
| Flow-level | Iperf | User-level application for bandwidth, packet loss ratio, and jitter testing |
| Flow-level | netperf | User-level application for simulating bulk data transfers |
| Flow-level | Brawny and Robust Traffic analysis (BRUTE) | Kernel-level flow generator |
| Flow-level | BRUTE on Network Processor (BRUNO) | Hardware implemented flow generator |
| Flow-level | Kernel-based Traffic analysis (KUTE) | Kernel-level flow generator |
| Flow-level | Traffic Generator (TG) | Flow generator supporting different distributions of packet inter-arrival times and sizes |
| Flow-level | mxtraff | User-level application that can create TCP and UDP streams to emulate mice (e.g., small, intermittent TCP flows), elephants (e.g., large, continuous TCP flows), and dinosaurs (e.g., constant and continuous UDP flows) |
| Stream-level | Harpoon | Flow-based generator that can replicate NetFlow based measurements |
| Stream-level | Distributed Internet Traffic Generator (D-ITG) | Workload generator for various network scenarios |
| Stream-level | Netspec | Distributed system for generating traffic; offers synchronized set of flow-level generators for emulating stream-level behavior |

TABLE 3-continued

Examples of Traffic Generators

| Type | Name | Description |
| --- | --- | --- |
| Application-level | Tmix | Traffic emulator for n2 based on source-level TCP connections |
| Application-level | Ostinato | User-level flow generator |
| Application-level | TCPreplay | User-level application for replaying libpcap files |
| Application-level | TCPivo | Kernel-level replay engine |
| Application-level | ParaSynTG | Web traffic generator |
| Application-level | Scalable URL Reference Generator (SURGE) | Http workload generator |
| Application-level | YouTube ® Workload Generator | Workload generator for video traffic |
| Application-level | LiTGen | Statistically models IP traffic resulting from web requests on a user and application basis |
| System-level | Swing | Traffic generator that can replicate user, application, and network behavior corresponding to real traffic measurements |
| System-level | Scalable and flexible Workload generator for Distributed Data processing systems (SWORD) | Uses decision trees to simulate various types of communications, including voice |

Figure 7:
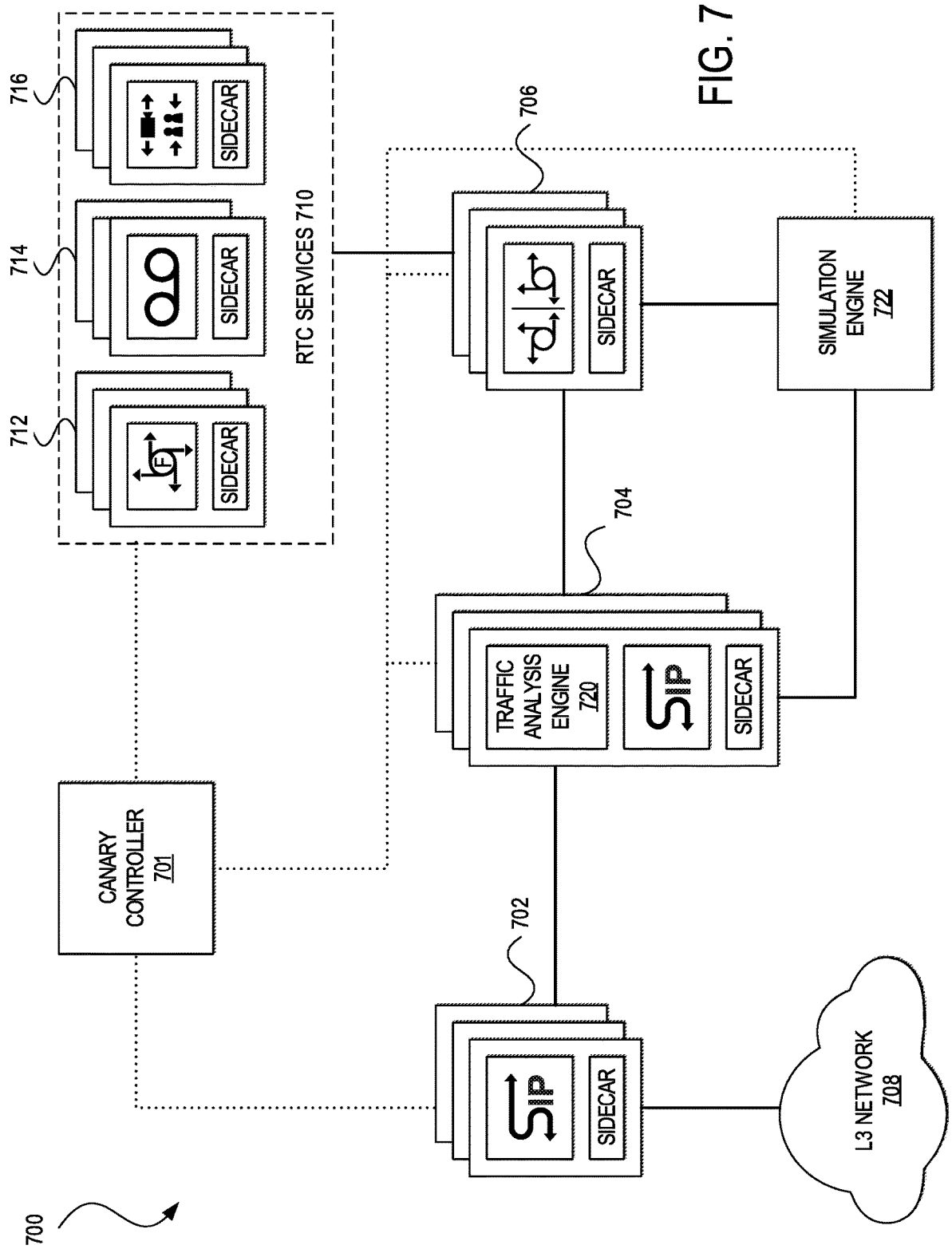
FIG. 7 illustrates an example of a containerized environment for providing real-time communications in accordance with an embodiment.

FIG. 7 illustrates an example of a containerized environment 700 for providing real-time communications in a network (e.g., the network 100 of FIG. 1). The containerized environment 700 may be similar in many respects to the containerized environment 400 of FIG. 4, and can include a canary controller 701 (e.g., the canary controller 500 of FIG. 5), a SIP edge proxy service 702, a SIP core proxy service 704, an SBC service 706, RTC services 710, a traffic analysis engine 720 (e.g., the traffic analysis engine 600 of FIG. 6), and a simulation engine 722. In this example, the traffic analysis engine 720 is co-located with the SIP core proxy service 704. An advantage of this configuration over the configuration of the containerized environment 400 of FIG. 4 is that the canary controller 701 may not need to fork or duplicate traffic traversing the SIP core proxy service 704 to a separate server. Instead, the co-located traffic analysis engine 720 can directly observe network traffic flowing through the SIP core proxy service 704 to build a model or models based on observed interactions to provide to the simulation engine 722. In other embodiments, the simulation engine 722 may also be co-located with the traffic analysis engine 720 to further reduce latency between the traffic analysis engine 720 and simulation engine 722.

Figure 8:
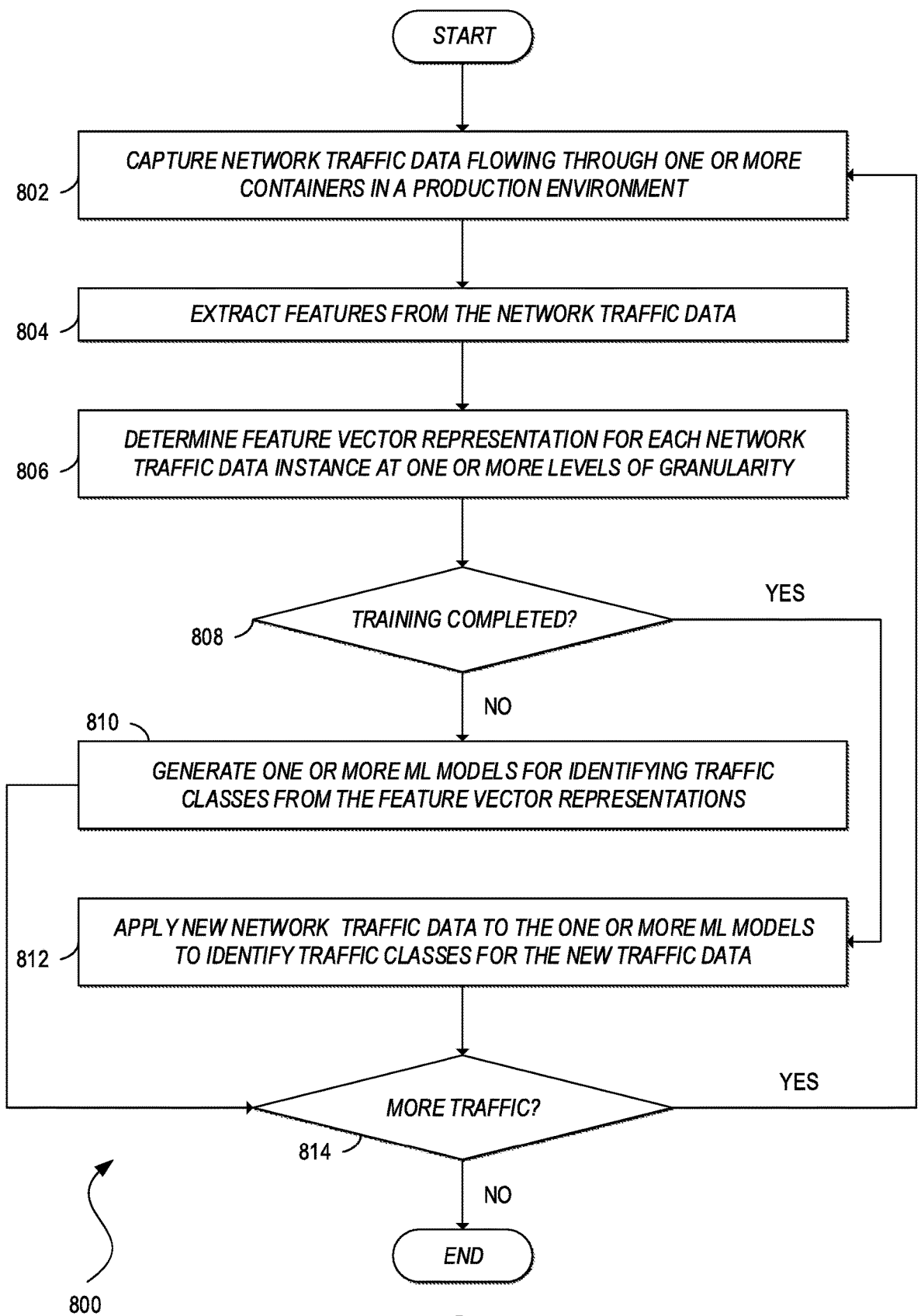
FIG. 8 illustrates an example of a process for generating a machine learning model for identifying traffic classes in accordance with an embodiment.

FIG. 8 illustrates an example of a process 800 for generating one or more machine learning models for identifying traffic classes from traffic network data. One of ordinary skill will understood that, for any processes discussed herein, there can be additional, fewer, or alternative steps performed in similar or alternative orders, or in parallel, within the scope of the various embodiments unless otherwise stated. The process 800 can be performed by a traffic analysis engine (e.g., the traffic analysis engine 600 of FIG. 6), which can be a standalone set of applications, application, set of services, service, set of microservices, or other containerized deployment or may be integrated with a controller for canary testing (e.g., the canary controllers 401, 500, or 701, etc.), a control plane of a containerized environment (e.g., the control plane 301), a control plane of a container orchestration platform (e.g., the master 202), and/or a network controller (e.g., the network controller 108).

In this example, the process 800 may begin with step 802 involving capture of network traffic data flowing through one or more containers of a containerized production environment. Capture can occur at a single node (e.g., networking device or endpoint) of the network, such as by the traffic analysis engines 420 or 720. In other embodiments, network traffic data may be captured by all of the nodes of the network or a subset of the nodes of the network. Capture can occur passively, such as a node or multiple nodes receiving the network traffic data, and/or actively, such as a node or multiple nodes generating signaling for capturing network telemetry.

After collection of the network traffic data, the process 800 may continue onto step 804, which can involve extracting feature values from the network traffic data. For example, extracted features can include those set forth in Table 2, such as packet header fields (e.g., protocol, source address, source port, destination address, destination port, class of service, etc.); flow data (e.g., flow duration, flow volume in bytes and number of packets, packet statistics, packet inter-arrival times, the union of TCP flags for a flow, etc.); bidirectional flow, request/response pair, or connection data (e.g., inter-arrival time between request/response pairs, connection duration, etc.); or session data (e.g., session duration, number of request/response pairs or connections, throughput distribution, etc.).

In some embodiments, the traffic analysis may also be capable of collecting host information corresponding to network traffic instances, such as the host name of the source or destination host, network address, operating system, CPU usage, network usage, disk space, ports, logged users, scheduled jobs, open files, and information regarding files and/or directories stored on the host. In some embodiments, the traffic analysis may also be capable of collecting process information corresponding to network traffic instances, such as the process name that originates network traffic data, process identifier, parent process identifier, process path, CPU utilization, memory utilization, memory address, scheduling information, nice value, flags, priority, status, start time, terminal type, CPU time taken by the process, the command that started the process, and the process owner.

In some embodiments, the traffic analysis may also be capable of collecting user information corresponding to network traffic instances, such as the user name that creates the network traffic data, user identifier, user's real name, e-mail address, user's groups, terminal information, login time, expiration date of login, idle time, and information regarding files and/or directories of the user. In some embodiments, the traffic analysis may also be capable of collecting virtualization information corresponding to network traffic instances, such as the name of the virtualization platform and version or build number, configuration information, host information (e.g., host operating system (OS), manufacturer, model, processor type, CPU cores, memory capacity, boot time, and other features similar to those of the host domain), a list of running VMs or containers, tenant information (e.g., tenant name, permissions, users associated with the tenant and individual user's information), and individual guest information (e.g., VM or container name, guest OS, guest memory utilization, guest CPU utilization, and other features similar to those of the host domain).

Feature values may be binary, numeric, categorical, character-based, or other primitive data types. Feature values may also be composites of primitive data types or abstract data types. Feature values may be structured or unstructured.

At step 806, the traffic analysis engine can build feature vector representations from the extracted features at various levels of granularity. That is, the traffic analysis engine may group extracted feature values to represent packets, unidirectional flows, bidirectional flows, request/response pairs, connections, messages, sessions, and/or other units of network traffic data. Although the process 800 refers to a vector representation for features, it will be appreciated that other representations are equivalent to vectors (e.g., lists, arrays, matrices, etc.) and/or other representations may be suitable for representing features and can be utilized in various embodiments (e.g., trees, hashes, graphs, histograms, etc.).

After determining the feature vector representations, the process 800 may proceed to decision block 808. If the network traffic data is captured during a machine learning training phase or model validation phase (e.g., when models are being learned or optimized), the process 800 may continue to step 810 in which the traffic analysis engine can analyze the feature vector representations according to one or more machine learning algorithms to generate one or more machine learning models for identifying traffic. As discussed, the traffic analysis engine may utilize unsupervised learning methods (e.g., k-means clustering, hierarchical clustering, density-based clustering, grid-based clustering, etc.) and/or supervised learning methods (e.g., k-nearest neighbor classification, Naïve Bayesian classification, boosting, perceptrons and neutral networks, decision trees and random forests, support vector machines, etc.). The traffic analysis engine can generate a monolithic model for classifying or clustering all traffic, individual classifiers for identifying specific traffic classes or clusters, or a hybrid or hierarchical approach (e.g., multi-class classifiers and clusterers for certain traffic classes and individual classifiers or clusterers for other types of classes). The traffic analysis engine may utilize the same or different machine learning algorithms for generating the machine learning models. After generating the machine learning models for identifying traffic classes, the process 800 can proceed to decision block 814 at which the process can end if no network traffic data remains for analysis or the process can return to step 802 to continue evaluating additional network traffic data.

Returning to decision block 808, if capture of network traffic data occurs during a machine learning evaluation phase (e.g. when models have been learned), the process 800 may proceed to step 812 in which the traffic analysis engine can apply feature vector representations for new network traffic data to the learned models to identify the traffic classes of the new traffic data. The traffic analysis engine can also determine the distribution of traffic classes over various time scales (e.g., seconds, minutes, hours, days, weeks, months, etc.) or occurring during certain events (e.g., initial registration, peak times, off-peak times, etc.). The machine learning models and distribution information may then be used to generate simulated traffic that reflects actual network traffic passing through the network. In turn, the simulated traffic may be used for canary release testing to expedite deployment of updated applications, services, and other containerized deployments as discussed further below. After identifying the traffic classes, the process 800 can continue to decision block 814 at which the process can end if no network traffic data remains for analysis or the process can return to step 802 to continue evaluating additional network traffic data.

Figure 9:
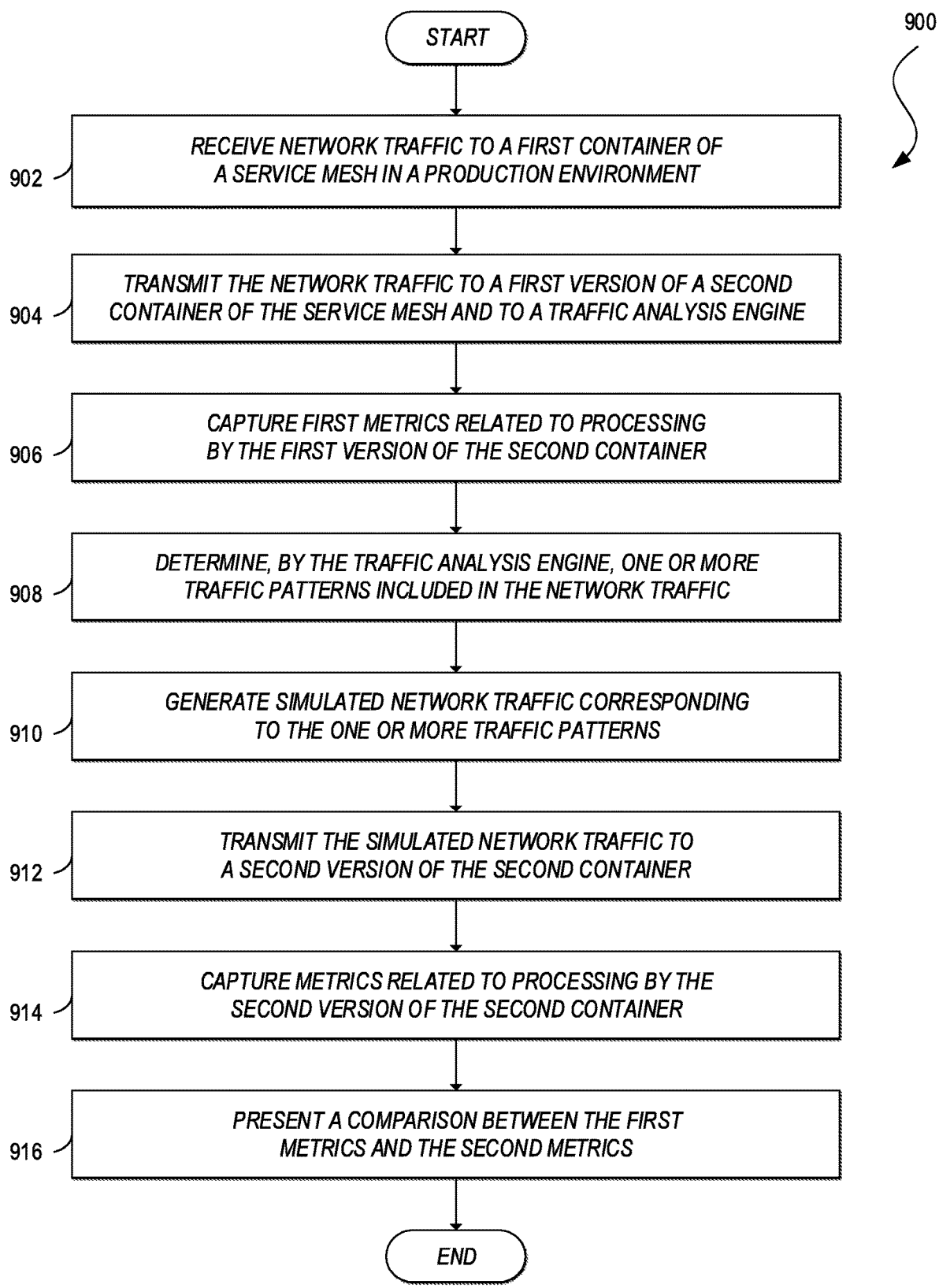
FIG. 9 illustrates an example of a process for validating a canary release of a containerized environment in accordance with an embodiment.

FIG. 9 illustrates an example of a process for validating a canary release of one or more containers of a containerized production environment. The process 900 may be performed within a containerized environment (e.g., the containerized environments 300, 400, 700, etc.), and can be managed by a controller for canary testing (e.g., the canary controllers 401, 500, 701, etc.), a control plane of a containerized environment (e.g., the control plane 301), a control plane of a container orchestration platform (e.g., the master 202), and/or a network controller (e.g., the network controller 108). In this example, the process 900 may begin at step 902 in which a first container or container pod (or a first set of containers/pods) of a containerized production environment can receive network traffic. In an embodiment, this can correspond to the SIP core proxy service 404 receiving network traffic from the SIP edge proxy service 402, or the SIP core proxy service 704 receiving network traffic from the SIP edge proxy service 702.

At step 904, processed network traffic handled by the first container(s)/pod(s) can be transmitted to a first version of a second container/pod (e.g., a non-canary version in the production environment) (or a set of containers/pods) and to a traffic analysis engine (e.g., the traffic analysis engine 600). In an embodiment, this can correspond to the SIP core proxy service 404 transmitting processed network traffic to the SBC service 406 and the traffic analysis engine 420, or the SIP core proxy service 704 transmitting processed network traffic to the SBC service 706 and the traffic analysis engine 720.

At step 906, various metrics relating to processing by the first version of the second container(s)/pod(s) can be captured. These metrics can include the number of requests processed by the first version of the second container(s)/pod(s), request duration, request size, response size, response type (e.g., HTTP response code; SIP response code; or other network protocol or API response types), CPU usage, memory usage, storage usage, bandwidth, and other data. The metrics can also be captured at various time scales (e.g., seconds, minutes, hours, days, weeks, months, etc.). In an embodiment, a control plane element (e.g., the Mixer 330) of the containerized environment can capture the metrics.

At step 908, the traffic analysis engine can analyze the feature vector representations (e.g., network traffic data instances) to identify traffic patterns within the network traffic data. The traffic patterns can be high-level representations of network traffic (e.g., web traffic, VoIP, bulk data transfer, etc.) as well as more granular traffic models (e.g., a set of protocol messages and the semantics of the protocol messages). For example, in an embodiment, the traffic analysis engine can reproduce the following traffic interaction between a core proxy service (e.g., the core proxy services 404 or 704) and an SBC service (e.g., the SBC services 406 or 706) to verify distinct interactions:

INVITE, 100 Trying, 180 Ringing, 200 OK, ACK.

As another example, the traffic analysis can reproduce the following message sequence between the core proxy and the SBC service:

INVITE, 100 Trying, 200 OK, ACK, reINVITE 200 OK, ACK, UPDATE, 200 OK.

One of ordinary skill in the art will appreciate that the semantics of messages will vary depending on the application and that these interactions are but a few examples of the traffic patterns that the traffic analysis engine can reproduce. For instance, the semantics of SIP and RTP transactions can vary across different interactions but share the same number, type, and direction of messages. The traffic analysis engine can capture the subtleties in semantic differences between various applications and protocols to ensure canary testing thoroughly accounts for these differences. As another example, there can be vast differences in the formatting of SDP messages across different interactions and the traffic analysis engine may be capable of reproducing each SDP session or many different types of SDP sessions rather than limiting to a single model representing all SDP traffic.

As discussed, traffic patterns can include the feature vector representations to one or more machine learning models to identify the traffic classes or clusters to which the feature vector representations belong. The traffic analysis engine can utilize supervised machine learning methods in which a training set of network traffic data instances are applied to one or more supervised machine learning algorithms (e.g., k-nearest neighbor, Naïve Bayesian classification, boosting, perceptrons and neural networks, decision trees and random forests, support vector machines, etc.) to determine one or more models for classifying network traffic. New network traffic data instances can then be provided as input to the model or models to identify the traffic classes of the new traffic data instances. The traffic analysis engine can also learn the distribution of the traffic classes over various time scales (e.g., seconds, minutes, hours, days, weeks, months, etc.).

Alternatively or in addition, the traffic analysis engine may utilize unsupervised learning methods, which may or may not include a training phase. If there is a training phase, a training set of feature vector representations can be evaluated using one or more unsupervised machine learning algorithms (e.g., k-means clustering, hierarchical clustering, density-based clustering, and grid-based clustering, etc.) to build one or more models for clustering new network traffic. The traffic analysis engine can evaluate new network traffic data instances against the model or models to identify the clusters with which the new network traffic data instances may be associated, and the clusters can operate as labels for characterizing the traffic classes of the new network traffic data instances. If there is no training phase, network traffic data can be collected and clustered over various time scales for identifying traffic classes and their distribution within the time scales.

At step 910, the model or models and distribution information can be used to generate corresponding simulated network traffic data. The simulated network traffic data can be created using various traffic generators, such as the examples set forth in Table 3. In some embodiments, a network may have a separate simulation engine (e.g., the simulation engine 422 of FIG. 4 or the simulate engine 722 of FIG. 7) for generating simulated network traffic. In other embodiments, a traffic generator (e.g., the traffic generator 612 of FIG. 6) may be integrated with the traffic analysis engine.

At step 912, the simulated network traffic data may be transmitted to a second version (e.g., a canary version) of the second container(s)/pod(s). In an embodiment, this can correspond to the simulation engine 422 transmitting simulated network traffic data to the SBC service 406 or the simulation engine 722 transmitting simulated network traffic data to the SBC service 706.

At step 914, various metrics relating to processing by the second version of the second container(s)/pod(s) can be captured. These metrics can correspond to the metrics captured at step 906 (e.g., the number of requests processed by the first version of the second container, request duration, request size, response size, response type, CPU usage, memory usage, storage usage, bandwidth, and other data). The metrics can also be captured at various time scales (e.g., seconds, minutes, hours, days, weeks, months, etc.). In an embodiment, a control plane element (e.g., the Mixer 330 of FIG. 3) of the containerized environment can capture the metrics.

The process 900 can conclude at step 916 in which a comparison between the metrics captured in step 906 and the metrics captured in step 914 can be presented in a user interface (e.g., the user interface 502 of FIG.), such as a web-based interface; standalone application or an application native to a client device, such as a desktop application or a mobile app; or other suitable user interface.

Figure 10A:
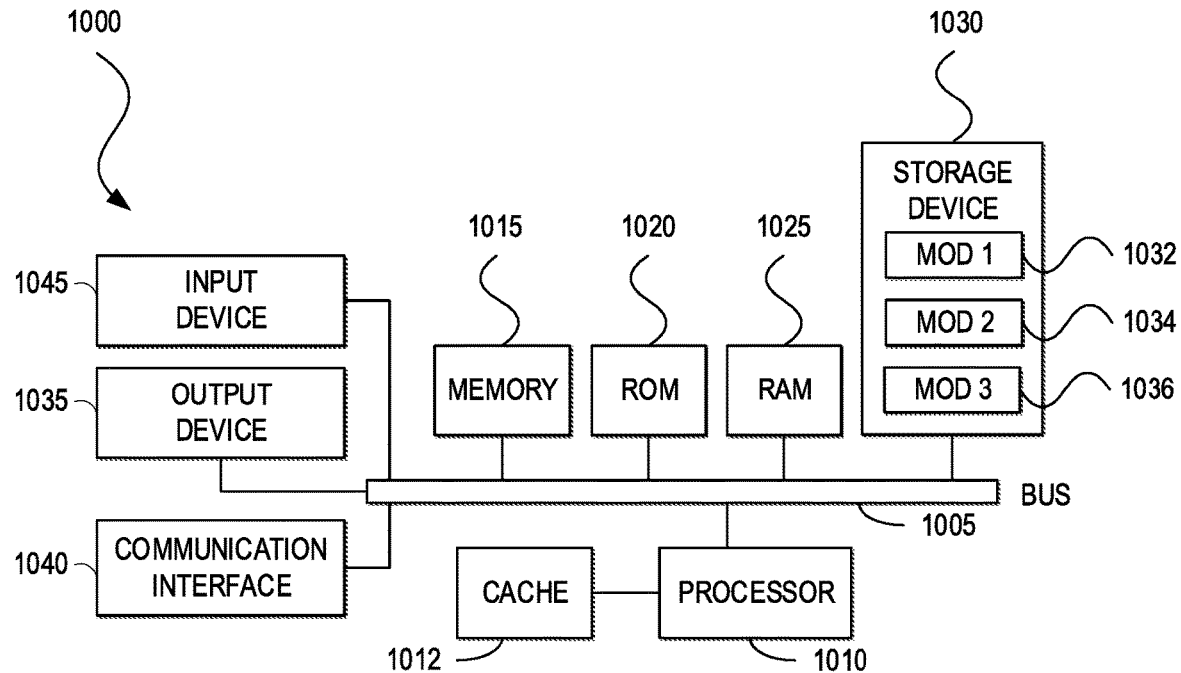
FIGS. 10A and 10B illustrate examples of systems in accordance with some embodiments.
Figure 10B:
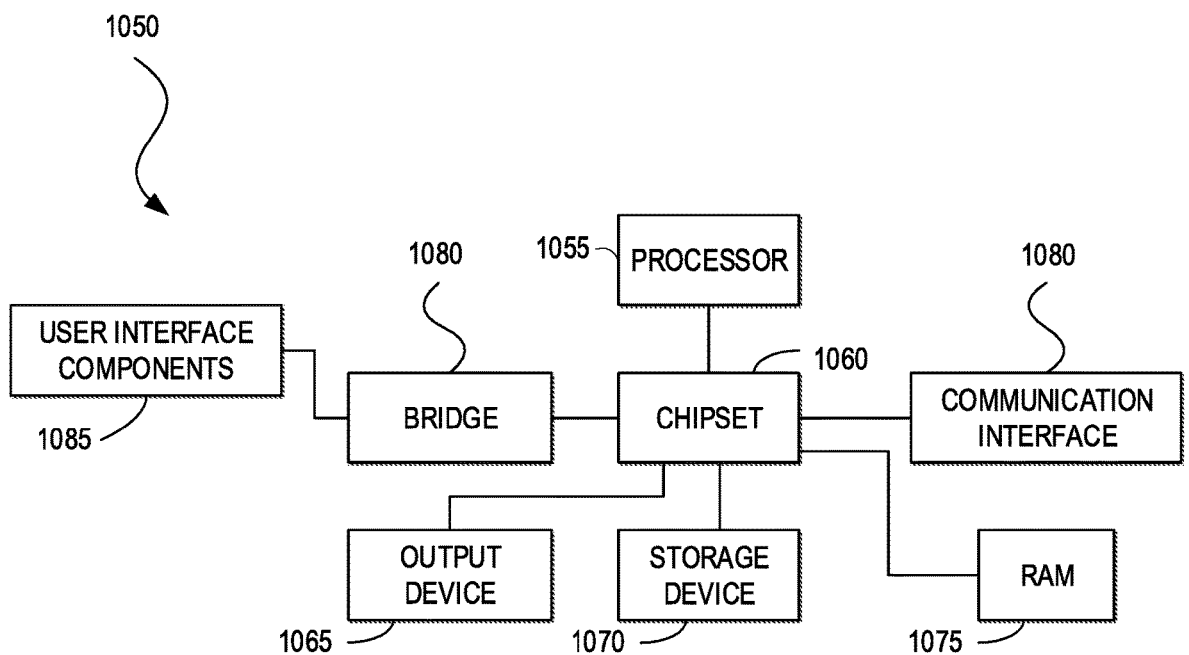

FIG. 10A and FIG. 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a conventional chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1080 that can have different physical interfaces. The communication interfaces 1080 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving network traffic to a first container of a containerized production environment;
transmitting the network traffic to a first version of a second container of the containerized production environment and to a traffic analysis engine;
capturing first metrics relating to a processing of the network traffic by the first version of the second container;
determining one or more traffic patterns included in the network traffic;
generating simulated network traffic corresponding to the one or more traffic patterns;
transmitting the simulated network traffic to a second version of the second container;
capturing second metrics relating to a processing of the simulated network traffic by the second version of the second container; and
generating and providing a comparison between the first metrics and the second metrics.

2. The computer-implemented method of claim 1, further comprising:
receiving a request for canary release testing of the containerized production environment; and
deploying containers of the second version on the containerized production environment for execution in one of a co-located host deployment, a non-overlapping host deployment, a partially overlapping host deployment, an optimized canary performance deployment, an optimized non-canary performance deployment, or a minimal canary performance deployment.

3. The computer-implemented method of claim 1, further comprising:
receiving a request for canary release testing of the second container;
determining a particular version of the first container that is compatible with the second version of the second container based on one of a white-list rule or a black-list rule; and
deploying a combination of the particular version of the first container and the second version of the second container for execution in the containerized production environment.

4. The computer-implemented method of claim 1, wherein at least one of the first metrics or the second metrics comprises at least one of a request duration metric, a request size metric, a response size metric, a processor usage metric, a memory usage metric, a storage usage metric, or a bandwidth metric.

5. The computer-implemented method of claim 1, further comprising:
extracting features from the network traffic;
determining, based on the features, feature vector representations for a plurality of instances of the network traffic; and
generating, based on the feature vector representations, one or more machine learning models for identifying traffic classes.

6. The computer-implemented method of claim 5, further comprising:
identifying the traffic classes for new network traffic by applying the new network traffic to the one or more machine learning models; and
determining a distribution of the traffic classes for the new network traffic,
wherein the simulated network traffic further corresponds to the distribution of the traffic classes.

7. The computer-implemented method of claim 5, wherein the one or more machine learning models are generated using clustering algorithms.

8. The computer-implemented method of claim 5, wherein the one or more machine learning models are generated using classification algorithms.

9. The computer-implemented method of claim 1, further comprising:
transmitting a first portion of live network traffic to the first version of the second container; and
transmitting a second portion of live network traffic to the second version of the second container.

10. The computer-implemented method of claim 1, wherein the traffic analysis engine executes in a host different from the first container.

11. The computer-implemented method of claim 1, wherein the traffic analysis engine executes in a container in a same pod as the first container.

12. The computer-implemented method of claim 1, wherein one of the one or more traffic patterns corresponds to a Session Initiation Protocol session.

13. A system comprising:
one or more processors; and
at least one computer-readable storage medium having stored therein instructions which, when executed by the one or more processors, cause the one or more processors to:
receive network traffic to a first container of a containerized production environment;
transmit the network traffic to a first version of a second container of the containerized production environment and to a traffic analysis engine;
capture first metrics relating to a processing of the network traffic by the first version of the second container;
determine one or more traffic patterns included in the network traffic;
transmit simulated network traffic corresponding to the one or more traffic patterns to a second version of the second container;
capture second metrics relating to a processing of the simulated network traffic by the second version of the second container; and
provide a comparison between the first metrics and the second metrics.

14. The system of claim 13, further comprising instructions which when executed further cause the one or more processors to:
receive a request for canary release testing of the containerized production environment; and
deploy containers of the second version on the containerized production environment for execution in one of a co-located host deployment, a non-overlapping host deployment, a partially overlapping host deployment, an optimized canary performance deployment, an optimized non-canary performance deployment, or a minimal canary performance deployment.

15. The system of claim 13, wherein at least one of the first metrics or the second metrics comprises at least one of a request duration metric, a request size metric, a response size metric, a processor usage metric, a memory usage metric, a storage usage metric, or a bandwidth metric.

16. The system of claim 13, further comprising instructions which when executed further cause the one or more processors to:
  deploy the first version of the second container to receive a first portion of live network traffic; and
  deploy the second version of the second container to receive a second portion of live network traffic.

17. A non-transitory computer-readable storage medium having stored therein instructions which, when executed by one or more processors, cause the one or more processors to:
  receive network traffic from a first container of a containerized production environment, wherein the network traffic is also received by a first version of a second container of the containerized production environment;
  capture first metrics relating to a processing of the network traffic by the first version of the second container;
  determine one or more traffic patterns included in the network traffic;
  cause simulated network traffic corresponding to the one or more traffic patterns to be generated;
  cause the simulated network traffic to be transmitted to a second version of the second container;
  capture second metrics relating to a processing of the simulated network traffic by the second version of the second container; and
  present a comparison between the first metrics and the second metrics.

18. The non-transitory computer-readable storage medium of claim 17, further comprising instructions which when executed further cause the one or more processors to:
  extract features from the network traffic;
  determine, based on the features, feature vector representations for a plurality of instances of the network traffic; and
  generate, based on the feature vector representations, one or more machine learning models for identifying traffic classes.

19. The non-transitory computer-readable storage medium of claim 18, further comprising instructions which when executed further cause the one or more processors to:
  identify the traffic classes for new network traffic by applying the new network traffic to the one or more machine learning models; and
  determine a distribution of the traffic classes for the new network traffic.

20. The non-transitory computer-readable storage medium of claim 18, wherein the instructions are executed in a container in a same pod as the first container.

* * * * *